(12) United States Patent
Takahashi et al.

(10) Patent No.: US 12,368,535 B2
(45) Date of Patent: Jul. 22, 2025

(54) TERMINAL, RADIO COMMUNICATION METHOD, AND BASE STATION

(71) Applicant: NTT DOCOMO, INC., Tokyo (JP)

(72) Inventors: Yuki Takahashi, Tokyo (JP); Satoshi Nagata, Tokyo (JP); Xiaohong Zhang, Beijing (CN); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 379 days.

(21) Appl. No.: 17/759,221

(22) PCT Filed: Jan. 30, 2020

(86) PCT No.: PCT/JP2020/003564
§ 371 (c)(1),
(2) Date: Jul. 21, 2022

(87) PCT Pub. No.: WO2021/152805
PCT Pub. Date: Aug. 5, 2021

(65) Prior Publication Data
US 2023/0048080 A1    Feb. 16, 2023

(51) Int. Cl.
*H04W 72/23* (2023.01)
*H04L 1/1812* (2023.01)
*H04W 72/1263* (2023.01)
*H04W 72/566* (2023.01)

(52) U.S. Cl.
CPC ....... *H04L 1/1812* (2013.01); *H04W 72/1263* (2013.01); *H04W 72/23* (2023.01); *H04W 72/569* (2023.01)

(58) Field of Classification Search
CPC .. H04L 1/1812; H04W 72/569; H04W 72/23; H04W 72/1263

USPC ......................................................... 370/329
See application file for complete search history.

(56) References Cited

U.S. PATENT DOCUMENTS

2020/0366415 A1* 11/2020 Khoshnevisan ...... H04W 16/14

FOREIGN PATENT DOCUMENTS

| CN | 110708146 A | 1/2020 | |
| WO | WO-2020033237 A1 * | 2/2020 | ........... H04L 1/1812 |

OTHER PUBLICATIONS

3GPP TSG RAN WG1 Meeting #99; R1-1912171; CATT; "Discussion on out-of-order scheduling/HARQ"; Reno, USA, Nov. 18-22, 2019 (5 pages).
Office Action issued in Chinese Application No. 202080095022.4, dated Jun. 20, 2024 (12 pages).
International Search Report issued in PCT/JP2020/003564 on Sep. 8, 2020 (2 pages).

(Continued)

*Primary Examiner* — Christopher R Crompton
(74) *Attorney, Agent, or Firm* — Osha Bergman Watanabe & Burton LLP

(57) ABSTRACT

A terminal according to an aspect of the present disclosure includes: a reception section that receives downlink control information for triggering feedback of a one-shot HARQ-ACK; and a control section that controls feedback of HARQ-ACKs each corresponding to one of a plurality of service types or HARQ-ACKs having different priorities by using different codebooks in a case where the feedback of the HARQ-ACK is performed on the basis of the downlink information.

6 Claims, 15 Drawing Sheets

(56) References Cited

OTHER PUBLICATIONS

Written Opinion of the International Searching Authority issued in PCT/JP2020/003564 on Sep. 8, 2020 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Chinese Application No. 202080095022.4, dated Dec. 31, 2024 (7 pages).

* cited by examiner

FIG. 7A

| NOTIFICATION OF TRIGGER FOR ONE-SHOT HARQ-ACK | | NOTIFICATION OF DCI FOR PDSCH SCHEDULING | CONTENT |
|---|---|---|---|
| ONE-SHOT HARQ-ACK FEEDBACK REQUEST = 1 | PRIORITY NOTIFICATION = 0 | PRIORITY NOTIFICATION = 0 | REQUEST FOR FEEDBACK OF HARQ-ACK BITS FOR eMBB |
| ONE-SHOT HARQ-ACK FEEDBACK REQUEST = 1 | PRIORITY NOTIFICATION = 1 | PRIORITY NOTIFICATION = 1 | REQUEST FOR FEEDBACK OF HARQ-ACK BITS FOR URLLC |

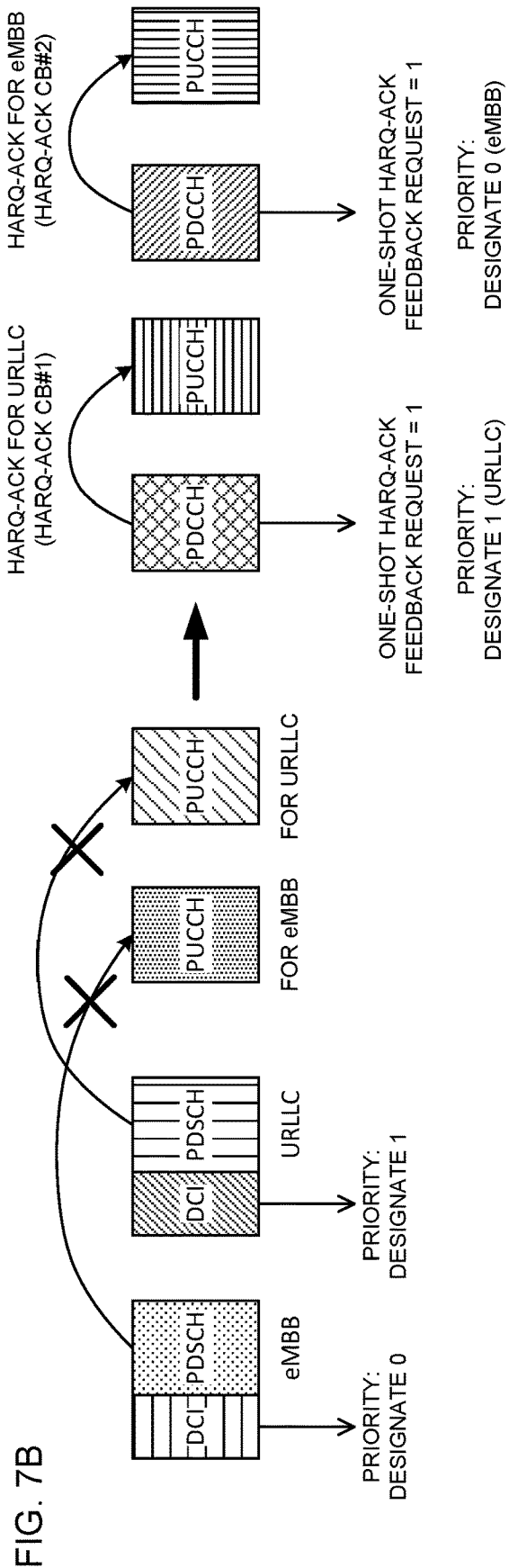

FIG. 7B

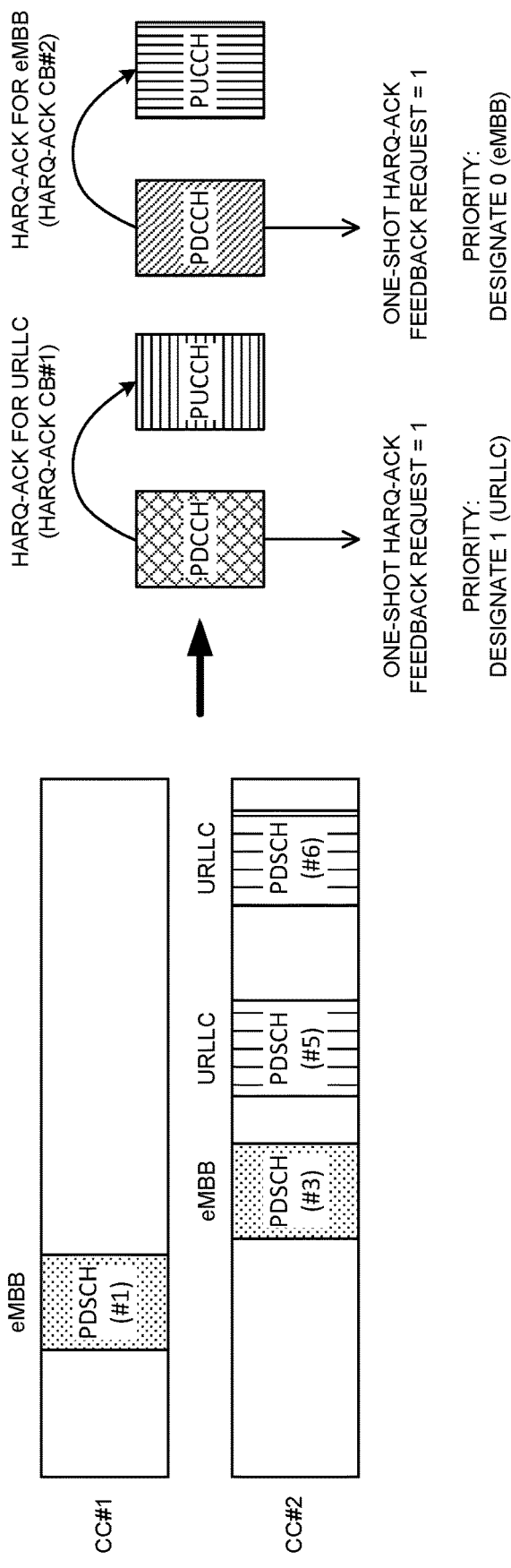

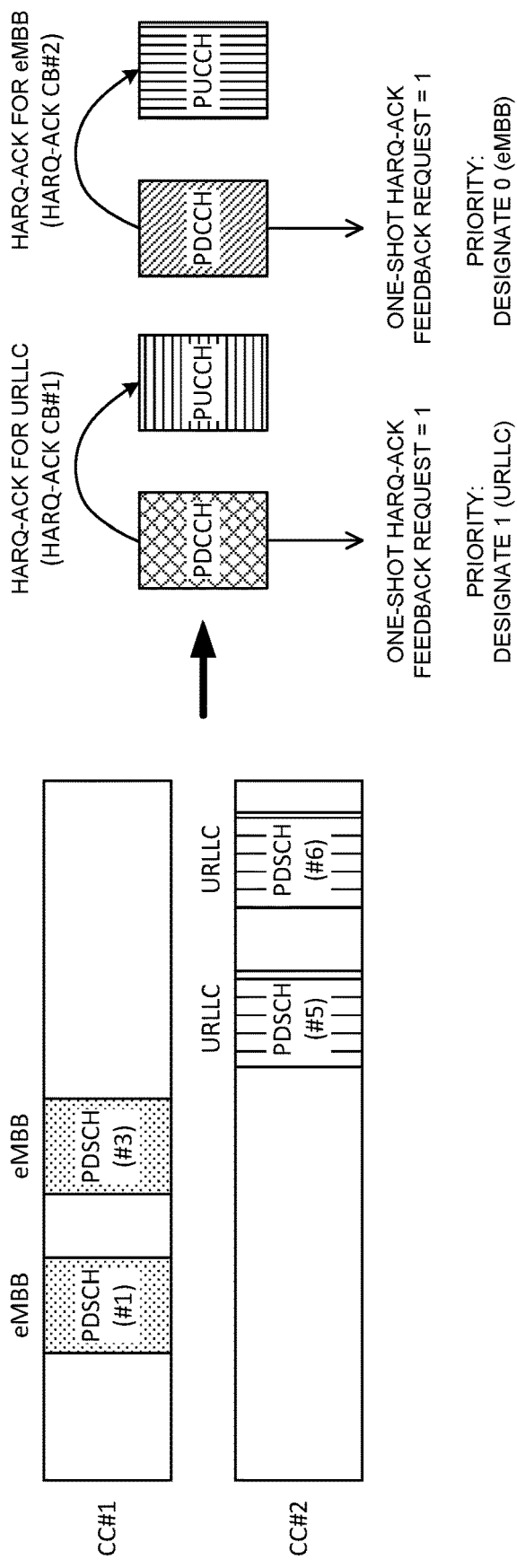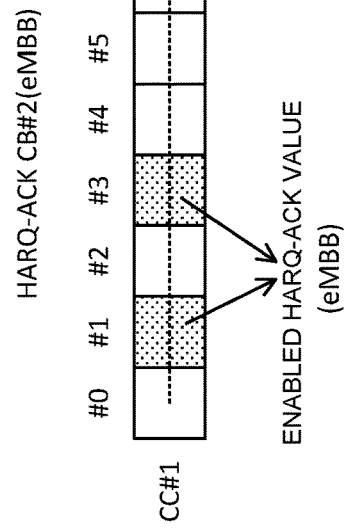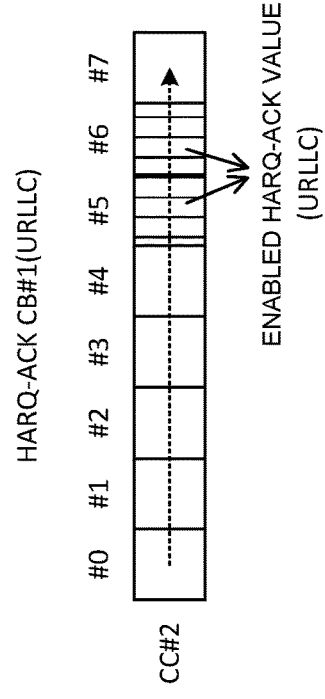

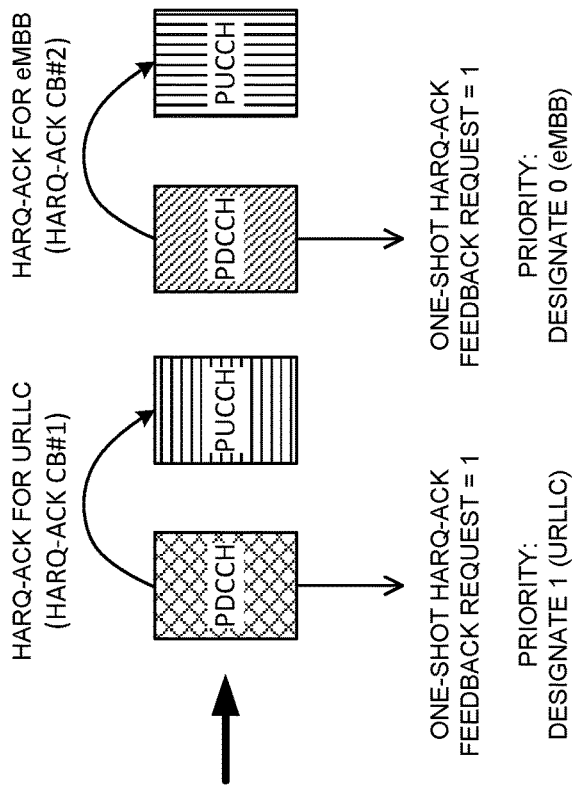
FIG. 10A
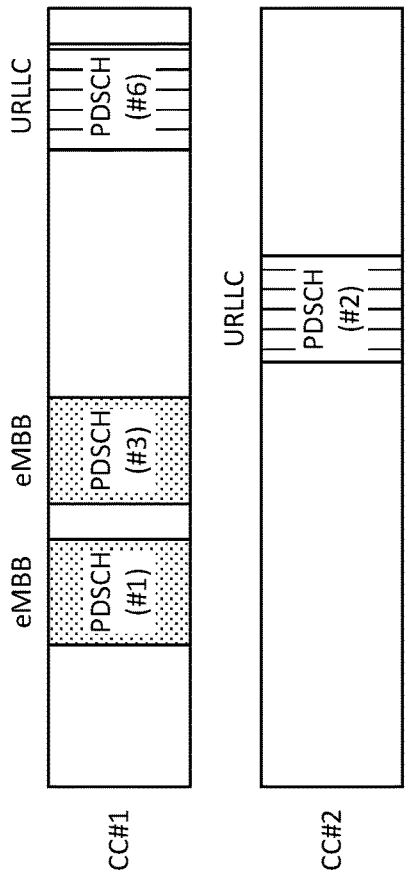
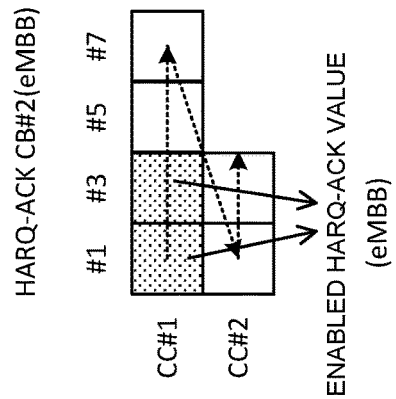
FIG. 10B
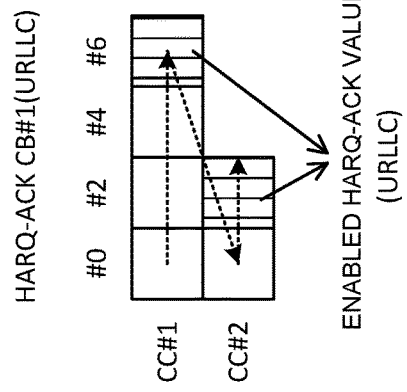
FIG. 10C

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a universal mobile telecommunications system (UMTS) network, specifications of long term evolution (LTE) have been drafted for the purpose of further increasing a data rate, providing low latency, and the like (see Non Patent Literature 1). Furthermore, the specifications of LTE-Advanced (Third Generation Partnership Project (3GPP) Release. (Rel.) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), New Radio (NR), or 3GPP Rel. 15 or later) are also being studied.

In addition, the existing systems support a configuration in which retransmission in the PDSCH is controlled when a UE feedbacks a delivery acknowledgement signal (HARQ-ACK, ACK/NACK, or A/N) for DL data (for example, in PDSCH).

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010.

SUMMARY OF INVENTION

Technical Problem

Future radio communication systems (such as 5G or NR) are expected to involve a plurality of traffic types (also referred to as services, types, service types, communication types, or use cases) having different requirements such as: higher speed and larger capacity (e.g., enhanced mobile broad band (eMBB)), a massive amount of terminals (e.g., massive machine type communication (mMTC), internet of things (IoT), and ultrahigh reliability and low latency (e.g., ultra reliable and low latency communications (URLLC)).

In a case where a UE supports (or uses) a plurality of service types, it is also assumed that a HARQ-ACK codebook used for HARQ-ACK feedback is set for every service type. In addition, in future radio communication systems, performing HARQ-ACK feedback for a plurality of HARQ processes at a time by a UE is being studied.

However, in a case where the configuration of a HARQ-ACK codebook is supported for each of the plurality of service types, how to control the HARQ-ACK feedback has not been sufficiently studied.

Therefore, one of the objects of the present disclosure is to provide a terminal, a radio communication method, and a base station capable of appropriately performing feedback of HARQ-ACK even in a case where communication is performed using a plurality of service types.

Solution to Problem

A terminal according to an aspect of the present disclosure includes: a reception section that receives downlink control information for triggering feedback of a one-shot HARQ-ACK; and a control section that controls feedback of HARQ-ACKs each corresponding to one of a plurality of service types or HARQ-ACKs having different priorities by using different codebooks in a case where the feedback of the HARQ-ACK is performed on the basis of the downlink information.

Advantageous Effects of Invention

According to one aspect of the present disclosure, feedback of HARQ-ACK can be appropriately performed even in a case where communication is performed using a plurality of service types.

BRIEF DESCRIPTION OF DRAWINGS

FIGS. 7A and 7B are diagrams illustrating another example of the one-shot HARQ-ACK feedback control according to the second aspect.

FIGS. 8A to 8C are diagrams illustrating another example of the one-shot HARQ-ACK feedback control according to the second aspect.

FIGS. 9A to 9C are diagrams illustrating another example of the one-shot HARQ-ACK feedback control according to the second aspect.

FIGS. 10A to 10C are diagrams illustrating another example of the one-shot HARQ-ACK feedback control according to the second aspect.

DESCRIPTION OF EMBODIMENTS

<Service (Traffic Type)>

Figure 1:
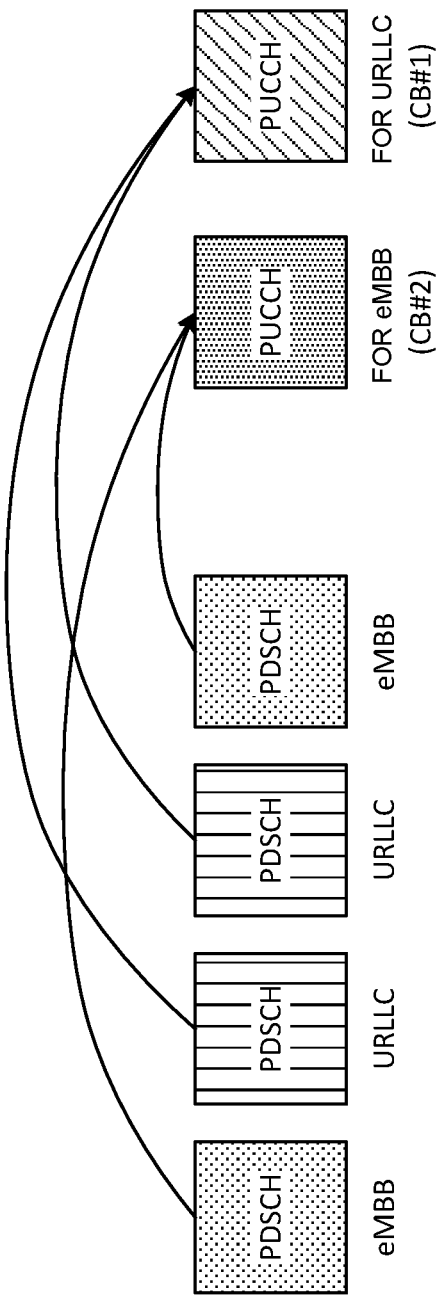
FIG. 1 is a diagram illustrating an example of a case where HARQ-ACK feedback is performed for every service type.

Future radio communication systems (e.g., NR) are expected to involve traffic types (also referred to as types, services, service types, communication types, or use cases) such as an enhanced mobile broadband (eMBB), machine type communications that embody multiple simultaneous connection (for example, massive machine type communications (mMTC), Internet of Things (IoT), and ultra-reliable and low-latency communications (URLLC). For example, it is required that URLLC have smaller latency and higher reliability than eMBB.

The traffic type may be identified in the physical layer on the basis of at least one of the followings.

Logical channels with different priorities
Modulation and coding scheme (MCS) table (MCS index table)
Channel quality indication (CQI) table
DCI format
System information-radio network temporary identifier (RNTI) used for scrambling (masking) of cyclic redundancy check (CRC) bit included in (added to) the DCI (DCI format)
Radio resource control (RRC) parameter
Specific RNTI (for example, RNTI for URLLC, MCS-C-RNTI, or the like)
Search Space
Given field in DCI (for example, reuse of newly added field or existing field)

Specifically, a traffic type of HARQ-ACK for a PDSCH (or PUCCH) may be determined on the basis of at least one of the followings.

MCS index table used to determine at least one of the modulation order, target code rate, and transport block size (TBS) of the PDSCH (for example, whether to use MCS index table 3)
RNTI used for CRC scrambling of DCI used for scheduling the PDSCH (for example, whether CRC scrambled with C-RNTI or MCS-C-RNTI)
Priority that is set in higher layer signaling A traffic type may be associated with communication requirements (requirements and required conditions such as latency and error rate), a data type (voice, data, etc.), or the like.

A difference between URLLC requirements and eMBB requirements may be that URLLC is lower in latency than eMBB or that URLLC requirements include reliability requirements.

For example, eMBB user (U)-plane latency requirements may include that downlink U-plane latency is 4 ms and that uplink U-plane latency is 4 ms. On the other hand, URLLC U-plane latency requirements may include that downlink U-plane latency is 0.5 ms and that uplink U-plane latency is 0.5 ms. Furthermore, the URLLC reliability requirements may include that a 32-byte error rate is $10^{-5}$ for a U-plane latency of 1 ms.

In contrast, enhancement of the reliability of traffic for unicast data is mainly studied as enhanced ultra reliable and low latency communications (eURLLC). Hereinafter, in a case where URLLC and eURLLC are not distinguished, they are simply referred to as URLLC.

<Priority Setting>

In the NR after Rel. 16, setting priorities at a plurality of levels (for example, two levels) for a given signal or channel is being studied. For example, it is assumed that communication is controlled (for example, transmission control at the time of collision, and the like) by setting different priorities for every signal or channel each corresponding to different traffic types (also referred to as services, service types, communication types, use cases, and the like). This makes it possible to control communication by setting, for the same signal or channel, different priorities depending on a service type or the like.

The priority may be set for a signal (for example, UCI such as HARQ-ACK and a reference signal), a channel (PDSCH, PUSCH, or the like), a HARQ-ACK codebook, or the like. The priority may be defined by a first priority (for example, High) and a second priority (for example, Low) that is lower than the first priority. Alternatively, three or more types of priorities may be set. The information regarding the priority may be notified from a base station to the UE by using at least one of higher layer signaling and DCI.

For example, a priority may be set for HARQ-ACK for PDSCH that is dynamically scheduled, HARQ-ACK for semi-persistent PDSCH (SPS PDSCH), and HARQ-ACK for SPS PDSCH release. Alternatively, priorities may be set for HARQ-ACK codebooks corresponding to these HARQ-ACKs. Note that, in a case where a priority is set to the PDSCH, the priority of the PDSCH may be replaced with the priority of HARQ-ACK for the PDSCH.

A UE may control UL transmission on the basis of the priorities in a case where different UL signals or UL channels conflict. For example, control may be performed so that UL transmission with high priority is performed and that UL transmission with low priority is not performed (for example, to drop). Alternatively, transmission timing of UL transmission with low priority may be changed (for example, to defer or to shift).

The collision between different UL signals/UL channels may be a case where time resources (or time resources and frequency resources) of the different UL signals or UL channels overlap with each other or a case where transmission timing of the different UL signals or UL channels overlap with each other.

In a case where the priorities are notified using DCI, whether or not a bit field (for example, priority indicator) for notifying the priority to the DCI is set may be notified or set from a base station to the UE using higher layer signaling. In addition, in a case where no bit field for notifying the priority to the DCI is included, the UE may determine that the priority of the PDSCH (or HARQ-ACK corresponding to the PDSCH) scheduled by the DCI is a specific priority (for example, low).

(HARQ-ACK Codebook)

A UE may send HARQ-ACK feedback using one piece of PUCCH resource for every HARQ-ACK codebook including one or more bits of delivery acknowledgement information (for example, hybrid automatic repeat request acknowledgement (HARQ-ACK)). HARQ-ACK bits may be referred to as HARQ-ACK information, HARQ-ACK information bits, or the like.

Here, a HARQ-ACK codebook may include bits for HARQ-ACK in at least one unit of the time domain (for example, a slot), the frequency domain (for example, a component carrier (CC)), the space domain (for example, a layer), a transport block (TB), and a code block group (CBG) included in the TB. A HARQ-ACK codebook may be simply referred to as a codebook.

Note that the number of bits (size) or the like included in the HARQ-ACK codebook may be determined semi-statically or dynamically. A HARQ-ACK codebook whose size is determined semi-statically is also referred to as, for example, a semi-static HARQ-ACK codebook or a type-1

HARQ-ACK codebook. A HARQ-ACK codebook whose size is determined dynamically is also referred to as, for example, a dynamic HARQ-ACK codebook or a type-2 HARQ-ACK codebook.

Which one of the type-1 HARQ-ACK codebook and the type-2 HARQ-ACK codebook is used may be set in the UE by using higher layer parameters (for example, pdsch-HARQ-ACK-codebook).

For the type-1 HARQ-ACK codebook, a UE may feedback, in a given range (for example, a range set on the basis of higher layer parameters), HARQ-ACK bits for a PDSCH candidate (or PDSCH occasion) corresponding to the given range, regardless of whether there is PDSCH scheduling.

The given range may be determined on the basis of at least one of a given period (for example, a set of a given number of occasions for receiving a candidate PDSCH or a given number of monitoring occasions of a PDCCH), the number of CCs configured or activated in the UE, the number of TBs (the number of layers or ranks), the number of CBGs per terabyte, and whether or not spatial bundling is applied. The given range is also referred to as a HARQ-ACK window, a HARQ-ACK bundling window, a HARQ-ACK feedback window, or the like.

In the type-1 HARQ-ACK codebook, the UE reserves HARQ-ACK bits for the PDSCH in the codebook if they are within a given range even in a case where the PDSCH is not scheduled for the UE. When having determined that the PDSCH is not actually scheduled, the UE can feedback the bits as NACK bits.

Meanwhile, in a case of the type-2 HARQ-ACK codebook, the UE may feedback the HARQ-ACK bits for the PDSCH that is scheduled within the given range.

Specifically, the UE may determine the number of bits of the type-2 HARQ-ACK codebook on the basis of a given field (for example, a downlink (DL) assignment indicator (index) (DAI)) field) in the DCI. Note that the DAI field may include a counter DAI (C-DAI) and a total DAI (T-DAI).

The C-DAI may indicate a counter value of downlink transmission (PDSCH, data, TB) scheduled within a given period. For example, the C-DAI in the DCI for scheduling data within the given period may indicate the number counted in the frequency domain (for example, CC) first and then in the time domain within the given period. For example, the C-DAI may correspond to a value obtained by counting the number of times of PDSCH reception or SPS release in ascending order of a serving cell index and then in ascending order of the PDCCH monitoring occasions for one or more DCIs included in the given period.

The T-DAI may indicate a total value (total number) of pieces of data scheduled within the given period. For example, the T-DAI in the DCI for scheduling data in a given time unit (for example, PDCCH monitoring occasions) within the given period may indicate the total number of pieces of data scheduled by the time unit (also referred to as a point, timing, and the like) within the given period.

It is also studied that HARQ-ACK codebooks are separately configured for different service types (alternatively, PDSCHs or HARQ-ACKs to which different priorities are set) (see FIG. 1). That is, it is conceivable that a plurality of HARQ-ACK codebooks are simultaneously configured to support a plurality of service types (or a plurality of priorities). For example, a first HARQ-ACK codebook (CB #1) corresponding to URLLC (for example, a first priority) and a second HARQ-ACK codebook (CB #2) corresponding to eMBB (for example, a second priority) may be configured.

In this case, a first PUCCH configuration parameter (for example, PUCCH configuration or PUCH configuration parameters) corresponding to the first HARQ-ACK codebook and a second PUCCH configuration parameter corresponding to the second HARQ-ACK codebook may be separately supported or configured. The PUCCH configuration parameter may be at least one of a PUCCH resource (or a PUCCH resource set) applied to transmission of HARQ-ACK, PUCCH transmission timing (for example, K1 set), a maximum code rate (for example, a max-code rate), and PUCCH transmission power.

In this case, first PUCCH configuration information may be applied to HARQ-ACK feedback for URLLC, and second PUCCH configuration information may be applied to HARQ-ACK feedback for eMBB.

<Unlicensed Band>

In an unlicensed band (for example, 2.4 GHz band, 5 GHz band, or 6 GHz band), it is assumed that a plurality of systems such as a Wi-Fi system and a system (LAA system) supporting licensed-assisted access (LAA) coexist. Therefore, it is necessary to avoid collision of transmissions and/or control interference between the plurality of systems.

In LAA of the existing LTE system (for example, Rel. 13), a transmitting apparatus of data performs listening (listen before talk (LBT), clear channel assessment (CCA), carrier sense, channel sensing, sensing, and a channel access procedure for confirming the presence or absence of transmission of other pieces of apparatus (for example, base station, user terminal, Wi-Fi device, and so on) before transmission of data in an unlicensed band.

The transmitting apparatus may be, for example, a base station (for example, gNB (gNodeB)) in the downlink (DL) and a user terminal (for example, user equipment (UE)) in the uplink (UL). Furthermore, a receiving apparatus that receives data from the transmitting apparatus may be, for example, a user terminal in DL and a base station in UL.

In the LAA of the existing LTE system, the transmitting apparatus starts data transmission after a given period (for example, immediately after or after a backoff period) after it is detected that there is no transmission from other pieces of apparatus in the LBT (idle state).

Use of an unlicensed band is also studied in a future radio communication system (for example, 5G, 5G+, New Radio (NR), or 3GPP Rel. 15 or later). An NR system using an unlicensed band may be referred to as an NR-unlicensed (U) system, an NR LAA system, or the like.

It is possible that dual connectivity (DC) between a licensed band and an unlicensed band, stand-alone (SA) of an unlicensed band, or the like be included in the NR-U.

A node (for example, a base station or a UE) in NR-U confirms that a channel is idle by LBT for coexistence with other systems or other operators and then starts transmission.

In an NR-U system, a base station (for example, gNB) or a UE obtains a transmission opportunity (TxOP) and performs transmission when an LBT result is idle. A base station or a UE does not perform transmission when the LBT result is busy (LBT-busy). Time of a transmission opportunity is referred to as channel occupancy time (COT).

Note that the LBT-idle may be replaced with LBT success. LBT-busy may be replaced with LBT failure.

<HARQ Process>

For a UE in which carrier aggregation (CA) or dual connectivity (DC) is configured, there may be one independent HARQ entity for each cell (CC) or each cell group (CG). A HARQ entity may manage a plurality of HARQ processes in parallel.

In a radio communication system, data transmission is based on scheduling, and scheduling information for downlink (DL) data transmission is carried in downlink control information (DCI). FIG. 1 is a diagram illustrating a relationship among HARQ entities, a HARQ process, and DCI. A HARQ process number (HPN) is given to a HARQ process. The DCI includes a 4-bit HARQ process number field indicating the HARQ process number used for the current data transmission. A HARQ entity manages a plurality (up to 16) of HARQ processes in parallel. That is, as HARQ process numbers, there are HPN0 to HPN15. A HARQ process number is also referred to as a HARQ process ID (HARQ process identifier).

A unit of transmitting uplink (UL) data by a physical uplink shared channel (PUSCH) and a unit of transmitting DL data by a physical downlink shared channel (PDSCH) may be referred to as a transport block (TB). A TB is a unit handled by the media access control (MAC) layer. The control of HARQ (retransmission) may be performed for each TB or may be performed for each code block group (CBG) including one or more code blocks (CBs) in a TB.

A user terminal transmits information indicating positive acknowledgement (ACK)/negative acknowledgement (NACK) of HARQ, which indicates whether or not decoding of a DL transport block having received using a PDSCH is successful, to a base station using a physical uplink control channel (PUCCH), a PUSCH, or the like.

In a case where a plurality of pieces of UL data or a plurality of pieces of DL data is not spatially multiplexed in the physical layer, a single HARQ process corresponds to one transport block (TB). In a case where a plurality of pieces of UL data or a plurality of pieces of DL data is spatially multiplexed in the physical layer, a single HARQ process may correspond to one or more transport blocks (TBs).

<One-Shot HARQ-ACK Feedback>

In Rel. 16 and later, it is studied to request or trigger feedback of a HARQ-ACK codebook including all HARQ-ACK processes to the UE in order to provide a transmission opportunity for HARQ-ACK feedback due to an LBT failure at the UE or misdetection of the PUCCH at the base station (see FIG. 2). The HARQ-ACK processes (for example, DL HARQ-ACK processes) may be HARQ-ACKs on all CCs configured for the UE in the PUCCH group.

Figure 2:
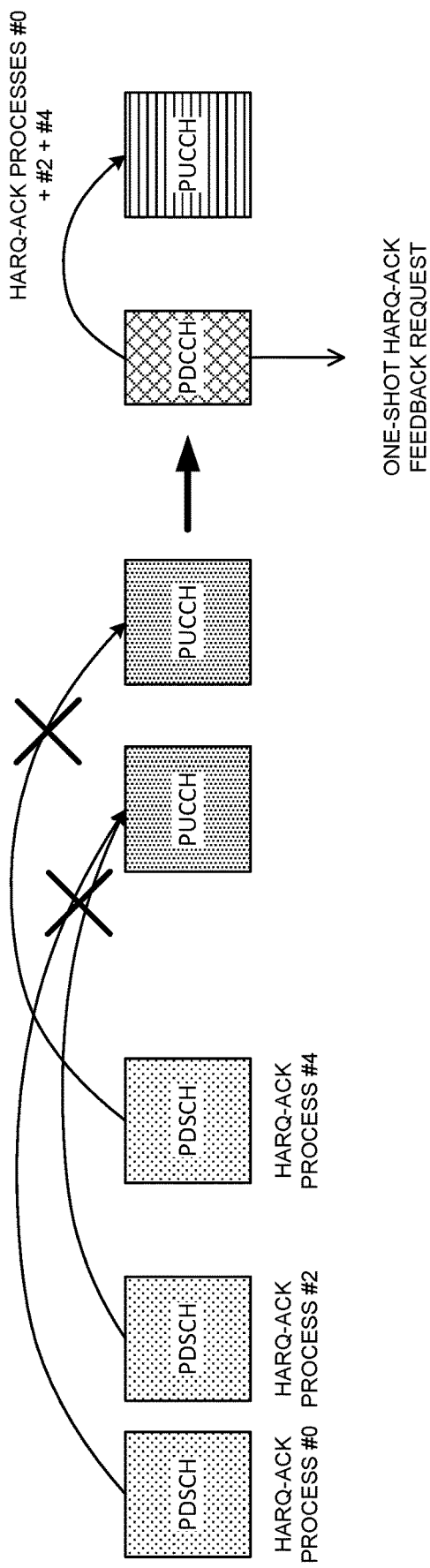
FIG. 2 is a diagram illustrating an example of one-shot HARQ-ACK feedback control.

Illustrated in FIG. 2 is a case where HARQ-ACK processes #0, #2, and #4 are fed back in response to a request for one-shot HARQ-ACK feedback.

The feedback of HARQ-ACK (or a HARQ-ACK codebook) including all HARQ-ACK processes on all CCs may be referred to as one-shot HARQ-ACK feedback. The one-shot HARQ-ACK feedback may be notified from the base station to the UE by using a given DCI format. The given DCI format may be a UE-specific DCI format (for example, DCI format 1_1).

The UE that has been requested or triggered of the one-shot HARQ-ACK feedback may feedback, using the PUCCH, a codebook including a plurality of (for example, all) HARQ-ACK processes in the respective CCs that have been configured.

In this manner, it is assumed that one-shot HARQ-ACK feedback is introduced. The one-shot HARQ-ACK feedback may be referred to as one-time HARQ-ACK feedback, a single HARQ-ACK feedback, one-shot HARQ-ACK, or the like.

However, in a case where the one-shot HARQ-ACK feedback is applied, how to control transmission (for example, PUCCH transmission) for HARQ-ACKs (for example, HARQ-ACK for eMBB, HARQ-ACK for URLLC) of different service types poses an issue.

For example, when the UE feeds back one HARQ-ACK codebook on the basis of a request or a trigger of one-shot HARQ-ACK feedback notified in given DCI, how to control the HARQ-ACK to be included in the HARQ-ACK codebook poses an issue.

The present inventors have studied how to apply or control the one-shot HARQ-ACK feedback in a case where transmission of HARQ-ACK (or a HARQ-ACK codebook) is supported for each of a plurality of service types (or priorities) and conceived the present embodiment.

Hereinafter, embodiments according to the present disclosure will be described in detail with reference to the drawings. The following aspects may be applied independently or may be applied in combination. In addition, the following embodiments can be applied to both a licensed band and an unlicensed band.

In addition, in the following description, a first priority (High) and a second priority (Low) will be described as examples of priorities, however, the number and type of the priority are not limited thereto. Three or more types (or three or more levels) of priorities may be applied. Furthermore, a priority set to each signal or channel may be set in a UE by higher layer signaling or the like.

In the following description, two service types of eMBB and URLLC will be described as examples of a plurality of service types, however, the types and the number of service types are not limited thereto. In addition, a service type may be set in association with the priority. In addition, in the following description, HARQ-ACK feedback based on a one-shot HARQ-ACK feedback request will be described as an example, however, the present embodiment is not limited thereto. For example, the present embodiment is applicable to HARQ-ACK feedback other than the one-shot HARQ-ACK feedback.

First Aspect

In a first aspect, a case is described in which a UE performs, on the basis of a request for one-shot HARQ-ACK feedback, transmission of HARQ-ACKs corresponding to respective different service types (for example, Re-Tx HARQ-ACKs) by using a one (or shared) HARQ-ACK codebook.

The network (for example, a base station) may instruct a UE to request or trigger one-shot HARQ-ACK feedback using at least one of DCI or higher layer signaling. For example, the UE may determine the presence or absence of one-shot HARQ-ACK feedback on the basis of a value of a given field (for example, one-shot HARQ-ACK request field) included in a given DCI format.

The given DCI format may be a DCI format (for example, at least one of DCI formats 1_0, 1_1, and 1_2) used for PDSCH scheduling. Furthermore, whether or not the given field is included in the DCI may be notified or set from the base station to the UE by using higher layer signaling.

The UE requested (or a trigger) of the one-shot HARQ-ACK feedback may include one or more HARQ-ACKs in one (or shared) HARQ-ACK codebook (CB) to perform the feedback. The HARQ-ACK to be included in one HARQ-ACK codebook may be a HARQ-ACK corresponding to a given HARQ-ACK process (or a given HARQ-ACK process number.).

The given HARQ-ACK process may be, for example, a HARQ-ACK process corresponding to a PDSCH scheduled for the UE. Furthermore, in a case where a plurality of CCs (or cells) is configured in the UE, HARQ-ACKs corresponding to HARQ-ACK processes in the plurality of CCs may be included in one HARQ-ACK codebook.

Figure 3:
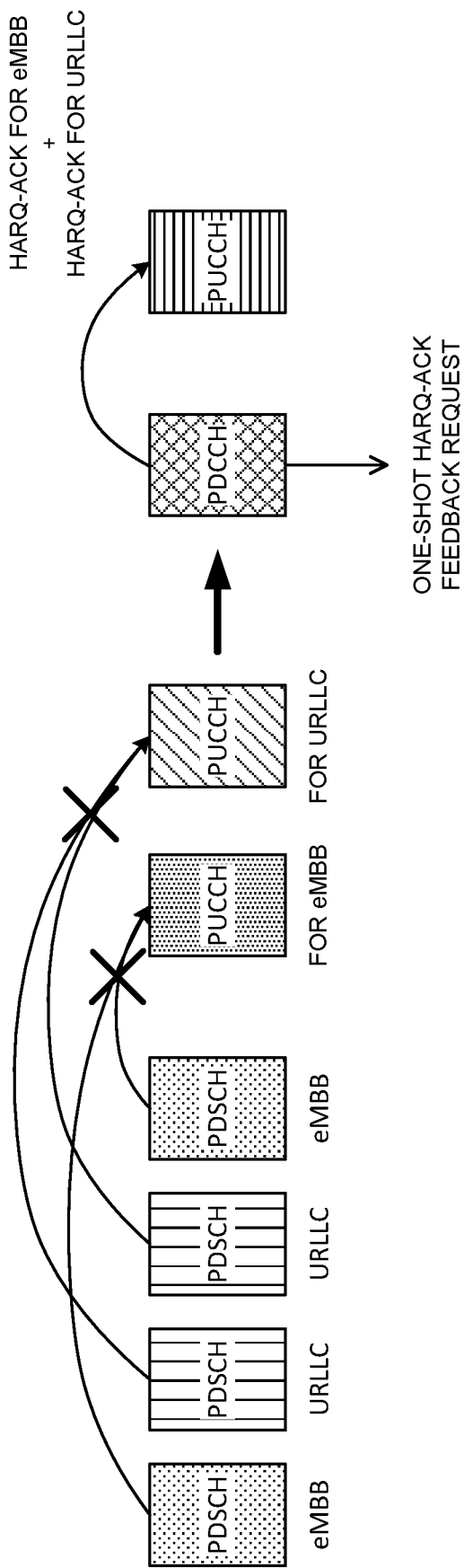
FIG. 3 is a diagram illustrating an example of one-shot HARQ-ACK feedback control according to a first aspect.

The UE may perform HARQ-ACK feedback by using one HARQ-ACK codebook even in a case where HARQ-ACKs corresponding to a given HARQ-ACK process correspond to different service types or different priorities (see FIG. 3).

Illustrated in FIG. 3 is a case where a HARQ-ACK for a PDSCH of eMBB (or the second priority) and a HARQ-ACK for a PDSCH of URLLC (or the first priority) cannot be transmitted (or the base station fails to receive), and then a one-shot HARQ-ACK feedback is requested to the UE.

Here, a case is illustrated in which a PUCCH (or a PUCCH resource) used for HARQ-ACK transmission of the PDSCH for eMBB and a PUCCH used for HARQ-ACK transmission of the PDSCH for URLLC are separately set. The PUCCH of each service type may be designated or configured by DCI (for example, a PUCCH resource instruction field) or the like for scheduling the PDSCH of each service type.

Before receiving the one-shot HARQ-ACK feedback request, the UE transmits a HARQ-ACK for every service type by using a PUCCH resource configured for each of them. In a case where a one-shot HARQ-ACK feedback request is received, the UE controls to perform feedback of the HARQ-ACK of the PDSCH for eMBB and the HARQ-ACK of the PDSCH for URLLC by using one HARQ-ACK codebook.

The HARQ-ACK codebook used for the one-shot HARQ-ACK feedback may be a HARQ-ACK codebook configured in consideration of HARQ-ACKs of a plurality of service types (for example, CCs used for transmission of the respective service types, the number of HARQ-ACK processes to be applied, and the like).

Also, in a case where a plurality of service types apply different HARQ-ACK codebook types (for example, a semi-static HARQ-ACK codebook (Type 1) and a dynamic HARQ-ACK codebook (Type 2)), one of the types may be selected. A specific codebook type (for example, Type 1) may be selected, or a codebook type that supports a specific service type may be selected. Alternatively, the codebook type to be applied may be defined in the specification in advance or may be notified from the base station to the UE by using DCI and higher layer signaling.

<Determination of PUCCH Resource>

In a case where a HARQ-ACK that supports different service types is transmitted by using one HARQ-ACK codebook, the UE may determine, on the basis of a given condition, a PUCCH configuration parameter (or a PUCCH parameter) used for transmission of the HARQ-ACK. The PUCCH configuration parameter may be at least one of a PUCCH resource (or a PUCCH resource set) applied to transmission of a HARQ-ACK, PUCCH transmission timing (for example, K1 set), the maximum code rate (for example, a max-code rate), and PUCCH transmission power.

The UE may determine a PUCCH configuration parameter used for HARQ-ACK feedback by using at least one of the following options 1-1 to 1-3.

[Option 1-1]

Figure 4:
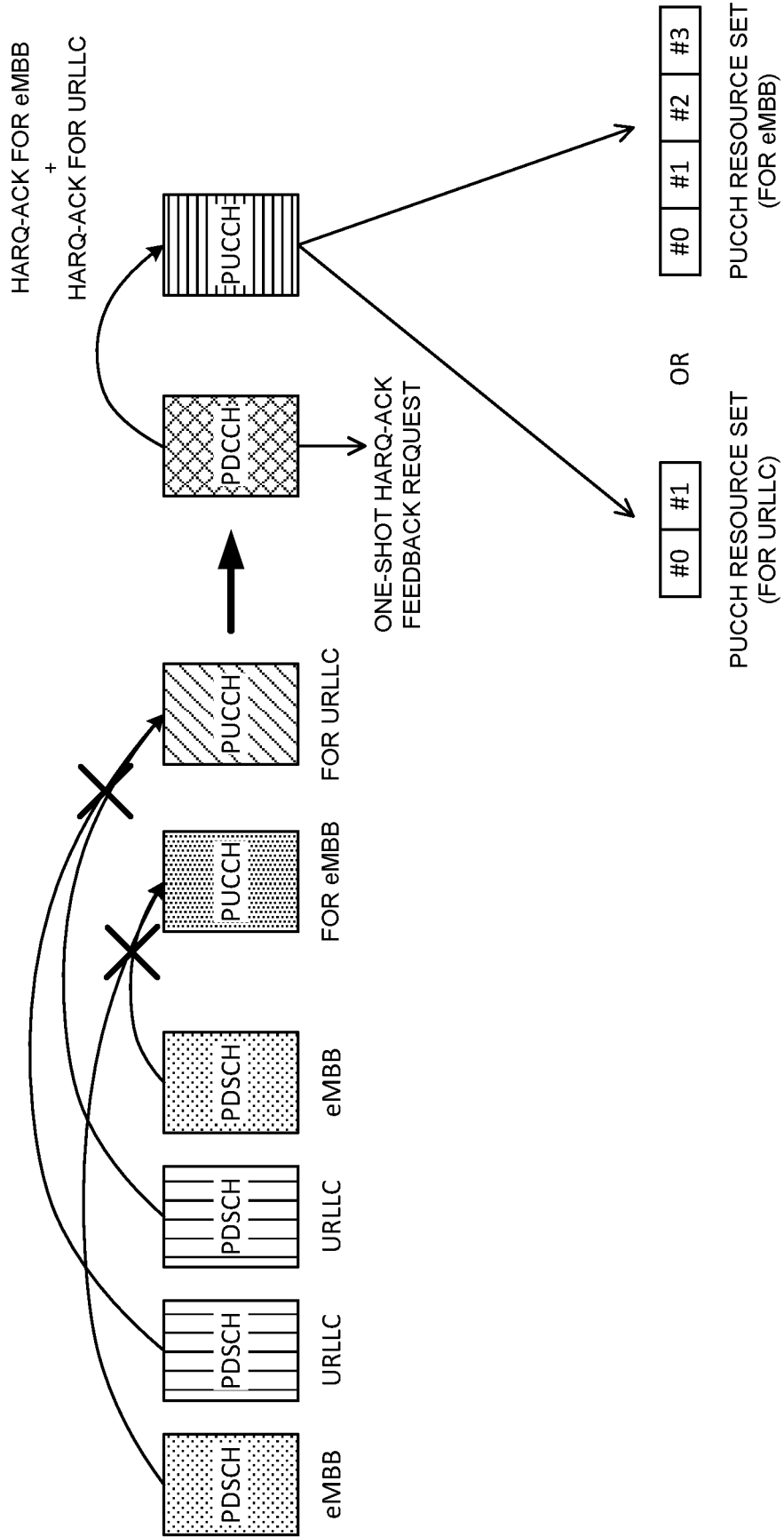
FIG. 4 is a diagram illustrating another example of the one-shot HARQ-ACK feedback control according to the first aspect.

The UE may apply a PUCCH configuration parameter corresponding to a HARQ-ACK of a specific service type (see FIG. 4). Illustrated in FIG. 4 is a case in which the first PUCCH configuration parameter (here, a first PUCCH resource set) is set to the HARQ-ACK for the PDSCH for URLLC (hereinafter, also referred to as HARQ-ACK for URLLC) and the second PUCCH configuration parameter (here, a second PUCCH resource set) is set to the HARQ-ACK for eMBB.

The first PUCCH resource set may be configured by at least one of DCI for scheduling the PDSCH for URLLC or higher layer signaling. Moreover, the second PUCCH resource set may be configured by at least one of DCI for scheduling the PDSCH for eMBB or higher layer signaling.

The UE may control so that the first PUCCH resource is always used when a codebook including the HARQ-ACK for URLLC and the HARQ-ACK for eMBB is transmitted by the one-shot HARQ-ACK feedback request (option 1-1-1). As a result, the PUCCH resource configured in consideration of high reliability and low latency can be applied as the PUCCH resource of the HARQ-ACK feedback.

Alternatively, the UE may control so that the second PUCCH resource is always used when a codebook including the HARQ-ACK for URLLC and the HARQ-ACK for eMBB is transmitted by the one-shot HARQ-ACK feedback request (option 1-1-2).

[Option 1-2]

The UE may determine a PUCCH (or a PUCCH configuration parameter) to be applied to a one-shot HARQ-ACK feedback on the basis of a notification from the base station.

For example, which PUCCH configuration parameter to apply among the PUCCH configuration parameters configured for their respective service types may be notified or configured from the base station to the UE using higher layer signaling (option 1-2-1).

Figure 5:
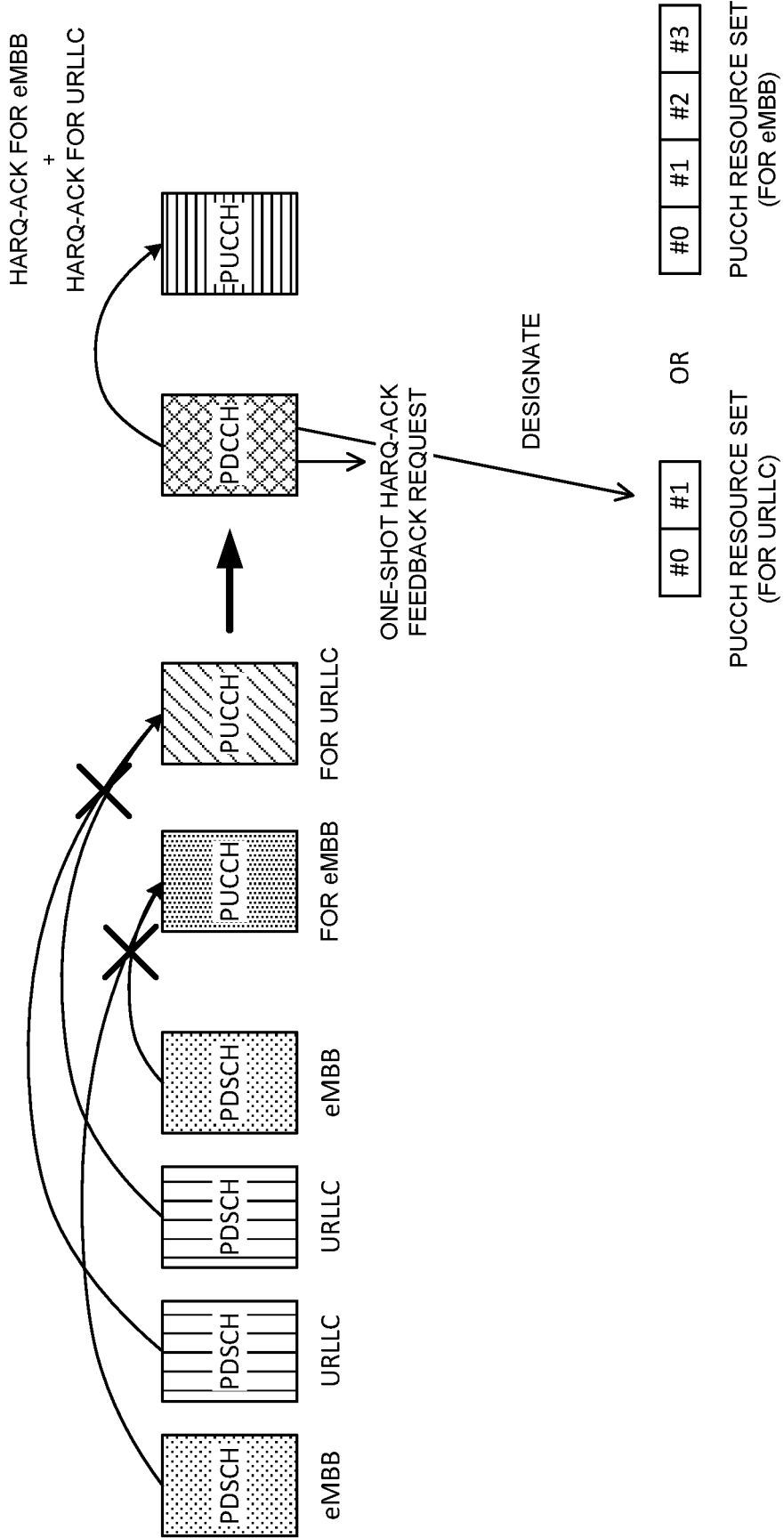
FIG. 5 is a diagram illustrating another example of the one-shot HARQ-ACK feedback control according to the first aspect.

Alternatively, which PUCCH configuration parameter to apply among the PUCCH configuration parameters configured for their respective service types may be instructed from the base station to the UE using DCI (option 1-2-2). The DCI used for the notification may be DCI (or PDCCH) for performing a one-shot HARQ-ACK feedback request (see FIG. 5).

In this case, a given PUCCH configuration parameter may be designated using a given field of the DCI that performs the one-shot HARQ-ACK feedback request. The given field may be a field for notifying the priority (for example, PriorityIndicator field) or may be a newly set field. For example, in a case where the bit value of the given field is "1", the UE applies a PUCCH configuration parameter (for example, the first PUCCH resource) corresponding to the HARQ-ACK for URLLC (see FIG. 5). If the bit value of the given field is "0", the UE applies a PUCCH configuration parameter (for example, the second PUCCH resource) corresponding to the HARQ-ACK for eMBB.

In a case where the given field is not included in the DCI for performing the one-shot HARQ-ACK feedback request, the UE may select a PUCCH configuration parameter corresponding to a HARQ-ACK for the specific service type. The specific service type may be defined in specifications in advance or may be notified or configured by higher layer signaling or the like from the base station to the UE.

[Option 1-3]

The UE may combine and apply PUCCH configuration parameters each corresponding to a service type. For example, the UE may combine and apply a part of the PUCCH configuration parameter corresponding to the HARQ-ACK for URLLC (for example, a PUCCH resource set, a maximum code rate) and a part of the PUCCH configuration parameter corresponding to the HARQ-ACK for eMBB (for example, PUCCH power control, K1 set).

The PUCCH configuration parameter selected from each service type may be defined in advance in specifications or may be notified or configured by higher layer signaling or the like from the base station to the UE.

Alternatively, at least one piece of PUCCH configuration information applied to the one-shot HARQ-ACK feedback may be newly set by at least one of DCI (for example, DCI used for the one-shot HARQ-ACK feedback request) or higher layer signaling. In this case, the PUCCH configuration parameter can be flexibly configured for a codebook including HARQ-ACKs for a plurality of service types.

Second Aspect

In a second aspect, a case is described in which a UE separately performs, on the basis of a request for one-shot HARQ-ACK feedback, transmission of a HARQ-ACK corresponding to each service type by using different HARQ-ACK codebooks (or PUCCH configuration parameters) for different service types (or priorities).

The base station may instruct a UE to request or trigger one-shot HARQ-ACK feedback using at least one of DCI or higher layer signaling. For example, the UE may determine the presence or absence of one-shot HARQ-ACK feedback on the basis of a value of a given field (for example, one-shot HARQ-ACK request field) included in a given DCI format.

The given DCI format may be a DCI format (for example, at least one of DCI formats 1_0, 1_1, and 1_2) used for PDSCH scheduling. Furthermore, whether or not the given field is included in the DCI may be notified or set from the base station to the UE by using higher layer signaling.

The UE requested (or triggered) of the one-shot HARQ-ACK feedback may use HARQ-ACK codebooks (CBs) that are different for every service type (or priority) to perform the feedback. In addition, the one-shot HARQ-ACK feedback may be separately requested (or triggered) for every service type. In this case, the UE may apply different PUCCH configuration parameters (for example, PUCCH resources) to the HARQ-ACKs of their respective service types for which the one-shot HARQ-ACK feedback requests have been separately notified.

For example, a HARQ-ACK codebook that includes only the HARQ-ACK for eMBB may be reported in the PUCCH resource for eMBB. In addition, a HARQ-ACK codebook that includes only the HARQ-ACK for URLLC may be reported in the PUCCH resource for URLLC.

Figure 6:
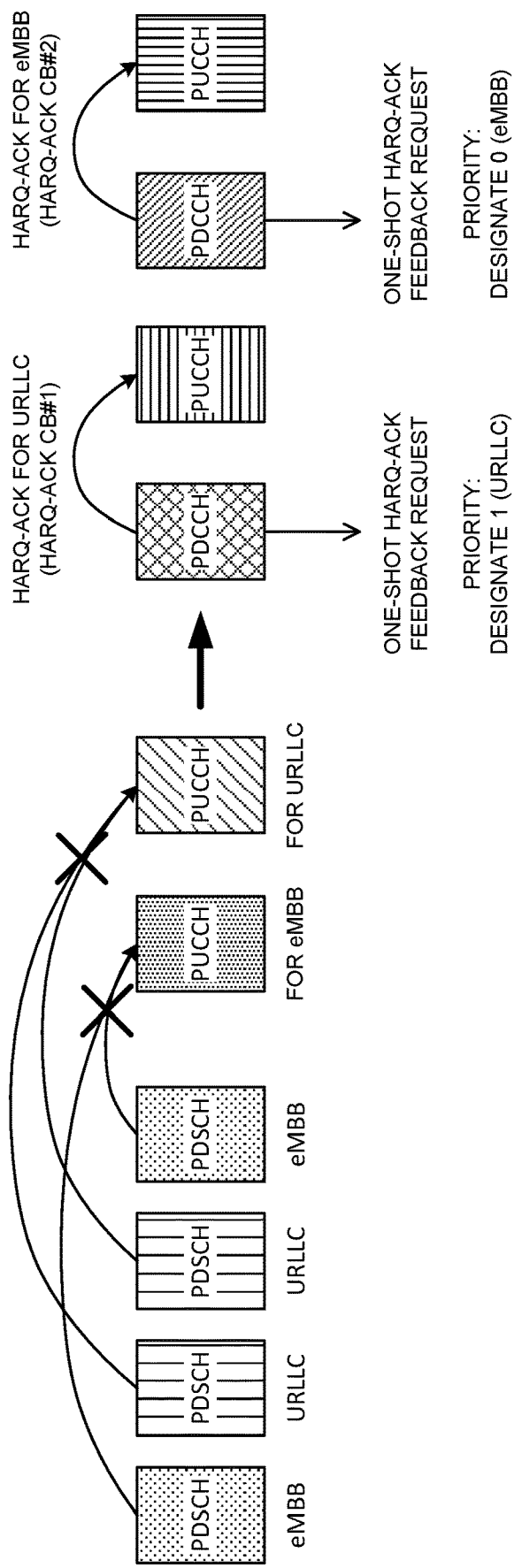
FIG. 6 is a diagram illustrating an example of one-shot HARQ-ACK feedback control according to a second aspect.

Illustrated in FIG. 6 is a case where a HARQ-ACK for a PDSCH of eMBB (or the second priority) and a HARQ-ACK for a PDSCH of URLLC (or the first priority) cannot be transmitted (or the base station fails to receive), and then a one-shot HARQ-ACK feedback is requested to the UE.

Before receiving the one-shot HARQ-ACK feedback request, the UE performs HARQ-ACK feedback by using a PUCCH resource configured for each service type. In a case where a one-shot HARQ-ACK feedback request is received, the UE separately controls the feedback of the HARQ-ACK of the PDSCH for eMBB and the HARQ-ACK of the PDSCH for URLLC by using HARQ-ACK codebooks (and PUCCH resources) that are different for every service type.

Furthermore, DCI requesting the one-shot HARQ-ACK feedback may be separately transmitted for every service type. Alternatively, one-shot HARQ-ACK feedback for a plurality of service types may be separately performed on the basis of one piece of DCI.

In a case where a HARQ-ACK codebook that performs the one-shot HARQ-ACK feedback includes a HARQ-ACK of a specific service type, a PUCCH resource corresponding to the specific service type may be applied in a similar manner to that before reception of the one-shot HARQ-ACK feedback request.

The correspondence (or mapping) between DCI for requesting or triggering the one-shot HARQ-ACK feedback (DCI for requesting/triggering) and the HARQ-ACK bits may be determined on the basis of a given field of the DCI (See FIGS. 7A and 7B). The given field may be a field for notifying of the priority (for example, PriorityIndicator field).

In the DCI for request/trigger, a service type for performing one-shot HARQ-ACK feedback is designated on the basis of a field (for example, One-shot HARQ-ACK request) instructing a one-shot HARQ-ACK request and a given field. On the other hand, in DCI used for PDSCH scheduling, a service type for performing HARQ-ACK feedback is designated on the basis of a given field. Note that the DCI used for PDSCH scheduling may not include a field (for example, One-shot HARQ-ACK request) for instructing the one-shot HARQ-ACK request (See FIGS. 7A and 7B).

<Determination of HARQ-ACK Codebook>

In a case where HARQ-ACKs each corresponding to a service type are transmitted using separate HARQ-ACK codebooks in response to a request for one-shot HARQ-ACK feedback, the UE may apply at least one of the following options 2-1 to 2-4.

[Option 2-1]

Here, a case is assumed in which the HARQ-ACK process numbers and CCs configured for the UE are dynamically scheduled (or applied) for a plurality of service types. That is, a case is assumed in which the same HARQ-ACK process number and CC may be applied to a plurality of service types. In addition, it is also assumed that the HARQ-ACK codebook size is semi-statically set on the basis of the number of CCs, the number of HARQ-ACK processes, and the like.

A HARQ-ACK codebook (alternatively, one-shot HARQ-ACK feedback) may be requested or designated on the basis of DCI. The HARQ-ACK codebook may include all HARQ-ACK process numbers in the CC configured for the UE. The UE may also determine the configuration of the HARQ-ACK codebook on the basis of the DCI (DCI for request/trigger) requesting the one-shot HARQ-ACK feedback (or HARQ-ACK codebook) (see FIG. 8A).

Illustrated in FIG. 8A is a case in which two CCs (CC #1 and CC #2) are configured for the UE supporting eMBB and URLLC, and eight HARQ-ACK processes can be configured for every CC. Here, a case is illustrated in which the PDSCH for eMBB (corresponding to HARQ-ACK process #1) is scheduled in CC #1, and the PDSCH for eMBB (corresponding to HARQ-ACK process #3) and two PDSCHs for URLLC (corresponding to HARQ-ACK processes #5 and #6) are scheduled in CC #2.

In a case where a one-shot HARQ-ACK feedback is requested by the DCI for request/trigger (for example, One-shot HARQ-ACK request=1), the UE may determine the service type (or priority) to which the one-shot HARQ-ACK feedback is applied on the basis of a given field (for example, Priority Indicator) of the DCI.

For example, in a case where the DCI for request/trigger corresponds to the first priority (for example, high HARQ-ACK priority) for URLLC, the UE may report the HARQ-ACK for URLLC as an enabled HARQ-ACK value (or may include in a codebook). In this case, the HARQ-ACK for URLLC may be mapped to a given position in the codebook on the basis of at least one of a HARQ-ACK process number and a CC index (see FIG. 8B).

FIG. 8B is a diagram illustrating an example of a HARQ-ACK codebook (CB #1) supporting URLLC. The UE includes HARQ-ACKs (here, HARQ-ACK processes #5 and #6 of CC #2) for URLLC in CB #1 as enabled HARA-ACK values.

On the other hand, the UE may be configured not to report, as an enabled HARQ-ACK, a HARQ-ACK process for eMBB or another HARQ-ACK process that is not scheduled. The UE may report a value of the HARQ-ACK that does not reported as an enabled HARQ-ACK as a fixed value (for example, one of NACK or ACK). In addition, the position of each HARQ-ACK process in the codebook may be determined on the basis of at least one of the HARQ-ACK process number or the CC index.

Illustrated in FIG. 8B a case where the UE includes HARQ-ACKs for eMBB (here, HARQ-ACK process #1 of CC #1, HARQ-ACK process #3 of CC #2) in CB #1 as disabled HARA-ACK values (here, NACK).

In a case where the DCI for request/trigger corresponds to the second priority (for example, low HARQ-ACK priority) for eMBB, the UE may report the HARQ-ACK for eMBB as an enabled HARQ-ACK value (or may include in a codebook). In this case, the HARQ-ACK for eMBB may be mapped to a given position in the codebook on the basis of at least one of a HARQ-ACK process number and the CC index (see FIG. 8C).

FIG. 8C is a diagram illustrating an example of a HARQ-ACK codebook (CB #2) supporting eMBB. The UE includes HARQ-ACKs for eMBB (here, HARQ-ACK process #1 of CC #1, HARQ-ACK process #3 of CC #2) in CB #2 as enabled HARA-ACK values.

On the other hand, the UE may be configured not to report, as an enabled HARQ-ACK, a HARQ-ACK process for URLLC or another HARQ-ACK process that is not scheduled. Illustrated in FIG. 8C a case where the UE includes HARQ-ACKs for URLLC (here, HARQ-ACK processes #5 and #6 of CC #2 in CB #2 as disabled HARA-ACK values (here, NACK).

As a result, even in a case where the HARQ-ACK process numbers and CCs configured for the UE are dynamically scheduled for a plurality of service types, a HARQ-ACK codebook corresponding to each service type can be appropriately configured.

[Option 2-2]

Here, a case is assumed in which PDSCHs each corresponding to a service type is scheduled in different frequency domains (for example, different CCs). That is, it is assumed that one of the PDSCH for eMBB and the PDSCH for URLLC is scheduled in a given CC (for example, CC #1) and that the other one is scheduled in another CC (for example, CC #2).

The PDSCH of which service type is scheduled for each CC (association between a CC and a service type) may be defined in advance in specifications, may be notified or configured by higher layer signaling or the like from the base station to the UE, or may be notified to the UE by the DCI for request/trigger.

Illustrated in FIG. 9A is a case in which two CCs (CC #1 and CC #2) are configured for the UE supporting eMBB and URLLC, and eight HARQ-ACK processes can be configured for every CC. In addition, a case is illustrated in which the PDSCH for eMBB is scheduled in CC #1, and the PDSCH for URLLC is scheduled in CC #2. Here, a case is illustrated in which two PDSCHs for eMBB (corresponding to HARQ-ACK processes #1 and #3) are scheduled in CC #1, and two PDSCH for URLLC (corresponding to HARQ-ACK processes #5 and #6) are scheduled in CC #2.

The HARQ-ACK codebook (alternatively, one-shot HARQ-ACK feedback) for eMBB may be requested or designated by DCI for eMBB. The HARQ-ACK codebook may include all HARQ-ACK processes corresponding to CCs of eMBB. Meanwhile, a HARQ-ACK codebook (alternatively, one-shot HARQ-ACK feedback) for URLLC may be requested or designated by DCI for URLLC. The HARQ-ACK codebook may include all HARQ-ACK processes corresponding to CCs of URLLC.

In a case where a one-shot HARQ-ACK feedback is requested by the DCI for request/trigger (for example, One-shot HARQ-ACK request=1), the UE may determine the service type (or priority) to which the one-shot HARQ-ACK feedback is applied on the basis of a given field (for example, Priority Indicator) of the DCI.

For example, in a case where the DCI for request/trigger corresponds to the first priority (for example, high HARQ-ACK priority) for URLLC, the UE may report the HARQ-ACK for URLLC as an enabled HARQ-ACK value. In this case, the HARQ-ACK for URLLC may be mapped to a given position in the codebook on the basis of at least one of a HARQ-ACK process number and a CC index for which URLLC is scheduled (see FIG. 9B).

FIG. 9B is a diagram illustrating an example of a HARQ-ACK codebook (CB #1) supporting URLLC. The HARQ-ACK codebook size may be determined on the basis of the number of CCs (here, one (CC #2)) for which URLLC is scheduled and the number of HARQ-ACK processes (here, 8 (#0 to #7)) supported by the CCs. The UE includes HARQ-ACKs (here, HARQ-ACK processes #5 and #6 of CC #2) for URLLC in CB #1 as enabled HARA-ACK values.

In a case where the DCI for request/trigger corresponds to the second priority (for example, low HARQ-ACK priority) for eMBB, the UE may report the HARQ-ACK for eMBB as an enabled HARQ-ACK value. In this case, the HARQ-ACK for eMBB may be mapped to a given position in the codebook on the basis of at least one of a HARQ-ACK process number and the CC index (see FIG. 9C).

FIG. 9C is a diagram illustrating an example of a HARQ-ACK codebook (CB #2) supporting eMBB. The HARQ-ACK codebook size may be determined on the basis of the number of CCs (here, one (CC #1)) for which eMBB is scheduled and the number of HARQ-ACK processes (here, 8 (#0 to #7)) supported by the CCs. The UE includes HARQ-ACKs (here, HARQ-ACK processes #1 and #3 of CC #1) for eMBB in CB #2 as enabled HARA-ACK values.

In this manner, by limiting the CCs in which PDSCHs of respective service types are scheduled, even in a case where the codebook to be applied in the HARQ-ACK feedback is determined semi-statically (for example, the number of CCs and the number of HARQ-ACK processes), the codebook size can be reduced.

[Option 2-3]

Here, a case is assumed in which a HARQ-ACK process number set for every CC is associated with a service type (or grouped depending on a service type). That is, in a given CC, a first HARQ-ACK process group (one or more HARQ-ACK process numbers) may be set for eMBB, and a second HARQ-ACK process group (for example, another HARQ-ACK process number) may be set for URLLC. A HARQ-ACK process group may be referred to as a HARQ-ACK process set.

For example, an odd HARQ-ACK process number may be set to one service type (for example, eMBB), and an even HARQ-ACK process number may be set to another service type (for example, URLLC). Note that the number of HARQ-ACK process numbers associated with each service type may be set so as to be equal or may be set so as to be larger for one service type (for example, URLLC).

In addition, a HARQ-ACK process number associated with each service type may be defined in specifications or may be notified from the base station to the UE by using at least one of higher layer signaling or DCI (for example, DCI for request/trigger). In addition, a HARQ-ACK process number corresponding to each service type may be set differently for every CC, or a HARQ-ACK process number corresponding to a service type may be shared by a plurality of CCs.

A PDSCH corresponding to each service type scheduled for the UE may be applied with only a HARQ-ACK process number in a HARQ-ACK process group (HARQ-ACK processes set/group) set for the service type.

Illustrated in FIG. 10A is a case in which two CCs (CC #1 and CC #2) are configured for the UE supporting eMBB and URLLC, eight HARQ-ACK processes can be set for CC #1, and four HARQ-ACK processes can be set for CC #2.

Furthermore, illustrated is a case in which, in CC #1, first HARQ-ACK process groups {#0, #2, #4, and #6} are set for URLLC, and second HARQ-ACK process groups {#1, #3, #5, and #7} are set for eMBB. Here, a case is illustrated in which two PDSCHs for eMBB (corresponding to HARQ-ACK processes #1 and #3) are scheduled in CC #1, a PDSCH for URLLC (HARQ-ACK process #6) is scheduled, and a PDSCH for URLLC (corresponding to HARQ-ACK process #2) is scheduled in CC #2.

The HARQ-ACK codebook (alternatively, one-shot HARQ-ACK feedback) for eMBB may be requested or designated by DCI for eMBB. The HARQ-ACK codebook may include a HARQ-ACK process included in a HARQ-ACK process group for eMBB in a CC configured for the UE. Meanwhile, a HARQ-ACK codebook (alternatively, one-shot HARQ-ACK feedback) for URLLC may be requested or designated by DCI for URLLC. The HARQ-ACK codebook may include a HARQ-ACK process included in a HARQ-ACK process group for URLLC in a CC configured for the UE.

In a case where a one-shot HARQ-ACK feedback is requested by the DCI for request/trigger (for example, One-shot HARQ-ACK request=1), the UE may determine the service type (or priority) to which the one-shot HARQ-ACK feedback is applied on the basis of a given field (for example, Priority Indicator) of the DCI.

For example, in a case where the DCI for request/trigger corresponds to the first priority (for example, high HARQ-ACK priority) for URLLC, the UE may report the HARQ-ACK for URLLC as an enabled HARQ-ACK value. In this case, the HARQ-ACK for URLLC may be mapped to a given position in the codebook on the basis of at least one of a CC index set to the UE and the HARQ-ACK process number (see FIG. 10B).

FIG. 10B is a diagram illustrating an example of a HARQ-ACK codebook (CB #1) supporting URLLC. The HARQ-ACK codebook size may be determined on the basis of the number of CCs configured for the UE (here, two) and the number of HARQ-ACK processes included in a HARQ-ACK process group for URLLC in each CC (here, four in CC #1 and two in CC #2). The UE includes HARQ-ACKs for URLLC (here, HARQ-ACK process #6 of CC #1, HARQ-ACK process #2 of CC #2) in CB #1 as enabled HARA-ACK values.

In a case where the DCI for request/trigger corresponds to the second priority (for example, low HARQ-ACK priority) for eMBB, the UE may report the HARQ-ACK for eMBB as an enabled HARQ-ACK value. In this case, the HARQ-ACK for eMBB may be mapped to a given position in the codebook on the basis of at least one of a CC index set to the UE and the HARQ-ACK process number (see FIG. 10C).

FIG. 10C is a diagram illustrating an example of a HARQ-ACK codebook (CB #2) supporting eMBB. The HARQ-ACK codebook size may be determined on the basis of the number of CCs configured for the UE (here, two) and the number of HARQ-ACK processes included in a HARQ-ACK process group for eMBB in each CC (here, four in CC #1 and two in CC #2). The UE includes HARQ-ACKs (here, HARQ-ACK processes #1 and #3 of CC #1) for eMBB in CB #2 as enabled HARA-ACK values.

In this manner, by associating different HARQ-ACK process numbers with a plurality of service types, even in a case where a codebook to be applied in HARQ-ACK feedback is determined semi-statically (for example, the number of CCs and the number of HARQ-ACK processes), the codebook size can be reduced.

[Option 2-4]

Here, a case is assumed in which the HARQ-ACK process numbers and CCs configured for the UE are dynamically scheduled for a plurality of service types. That is, a case is assumed in which the same HARQ-ACK process number and CC may be applied to a plurality of service types. It is also assumed that the HARQ-ACK codebook size is dynamically set on the basis of a scheduled PDSCH.

In this case, the UE may control the HARQ-ACK feedback (for example, HARQ-ACK codebook generation) on the basis of a counter DAI and a total DAI included in the DCI. For example, the HARQ-ACK codebook size may be determined by the total DAI included in the DCI for request/trigger, and the position of the HARQ-ACK in the codebook may be determined on the basis of the counter DAI included in the DAI that schedules the PDSCH (see FIG. 11A).

Figure 11A:
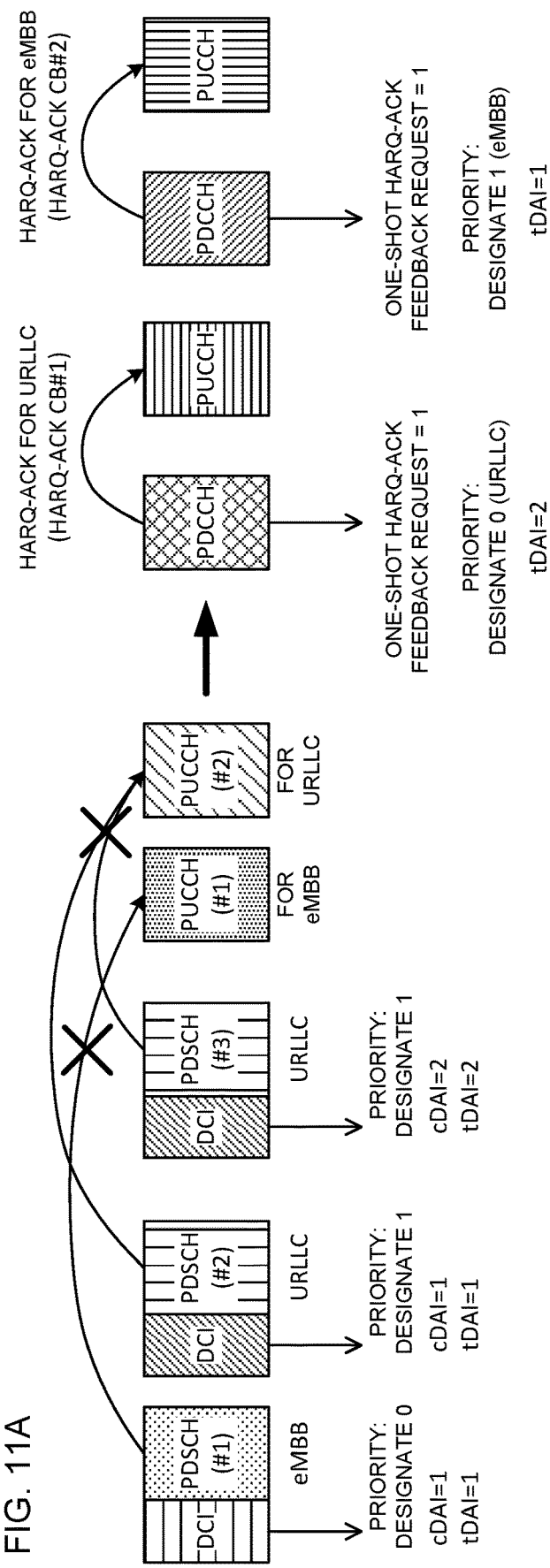
FIGS. 11A to 11C are diagrams illustrating another example of the one-shot HARQ-ACK feedback control according to the second aspect.

In FIG. 11A, a counter DAI (=1) and a total DAI (=1) are included in DCI for scheduling the PDSCH (#1) for eMBB. Meanwhile, a counter DAI (=1) and a total DAI (=1) are included in DCI for scheduling the PDSCH (#2) for URLLC, and a counter DAI (=2) and a total DAI (=2) are included in DCI for scheduling the PDSCH (#3).

Figure 11C:
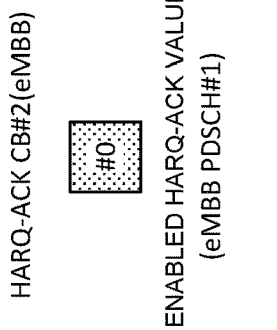
Figure 11B:
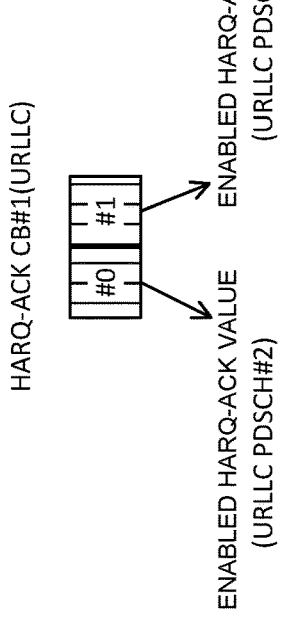

In a case where DCI for request/trigger requesting one-shot HARQ-ACK feedback for URLLC is received, the UE includes HARQ-ACK for URLLC (here, #2 and #3) in a codebook for URLLC (CB #1) on the basis of the DCI for request/trigger (see FIG. 11B). The codebook size of CB #1 may be determined on the basis of the total DAI included in the DCI for request/trigger.

In addition, the location of HARQ-ACK corresponding to each PDSCH in the codebook may be determined on the basis of the counter DAI included in the DCI that schedules the PDSCH. Here, a case is illustrated in which a HARQ-ACK corresponding to the PDSCH #2 having a small counter DAI value is mapped to the position of #0, and a HARQ-ACK corresponding to the PDSCH #3 is mapped to the position of #1.

In a case where DCI for request/trigger requesting one-shot HARQ-ACK feedback for eMBB is received, the UE includes HARQ-ACK for eMBB (here, #1) in a codebook for eMBB (CB #2) on the basis of the DCI for request/trigger (see FIG. 11C). The codebook size of CB #2 may be determined on the basis of the total DAI included in the DCI for request/trigger.

In addition, the location of HARQ-ACK corresponding to each PDSCH in the codebook may be determined on the basis of the counter DAI included in the DCI that schedules the PDSCH. Here, a case where the HARQ-ACK corresponding to PDSCH #1 is mapped to the position of #0 is illustrated.

Note that, in the above description, the case where the codebook size of the one-shot HARQ-ACK feedback is determined on the basis of the total DAI included in the DCI for request/trigger has been described, however, the present invention is not limited thereto. For example, the codebook size may be determined on the basis of a total DAI included in the most recent DCI that schedules a PDSCH for each service type.

Note that, in the second aspect, HARQ-ACK codebooks applied to one-shot HARQ-ACK feedback has been described, however, the HARQ-ACK codebooks may be applied in HARQ-ACK feedback performed before the one-shot HARQ-ACK feedback request.

<Variations>

The one-shot HARQ-ACK feedback illustrated in the first aspect and the one-shot HARQ-ACK feedback illustrated in the second aspect may be applied in combination (for example, by switching).

For example, whether or not the one-shot HARQ-ACK feedback includes a plurality of service types (eMBB and URLLC) may be notified from a base station to the UE by using at least one of higher layer signaling or L1 signaling. The L1 signaling may be DCI (for example, DCI for request/trigger).

In a case where the notification is mode by L1 signaling, a new field or an existing field may be used to specify whether or not the one-shot HARQ-ACK feedback supports a configuration including a plurality of service types. A given bit field (for example, a 2-bit field) may be included in the DCI for request/trigger to notify information regarding a service type to which the one-shot HARQ-ACK feedback (or one HARQ-ACK codebook) is applied.

For example, it may mean that the one-shot HARQ-ACCK feedback supports multiple service types when the given bit field is "00", that the one-shot HARQ-ACK feedback includes only eMBB when the given bit field is "01", and that the one-shot HARQ-ACK feedback includes only URLLC when the given bit field is "10".

(Radio Communication System)

Hereinafter, a configuration of a radio communication system according to one embodiment of the present disclosure will be described. In this radio communication system, communication is performed using one or a combination of the radio communication methods according to the embodiments of the present disclosure.

Figure 12:
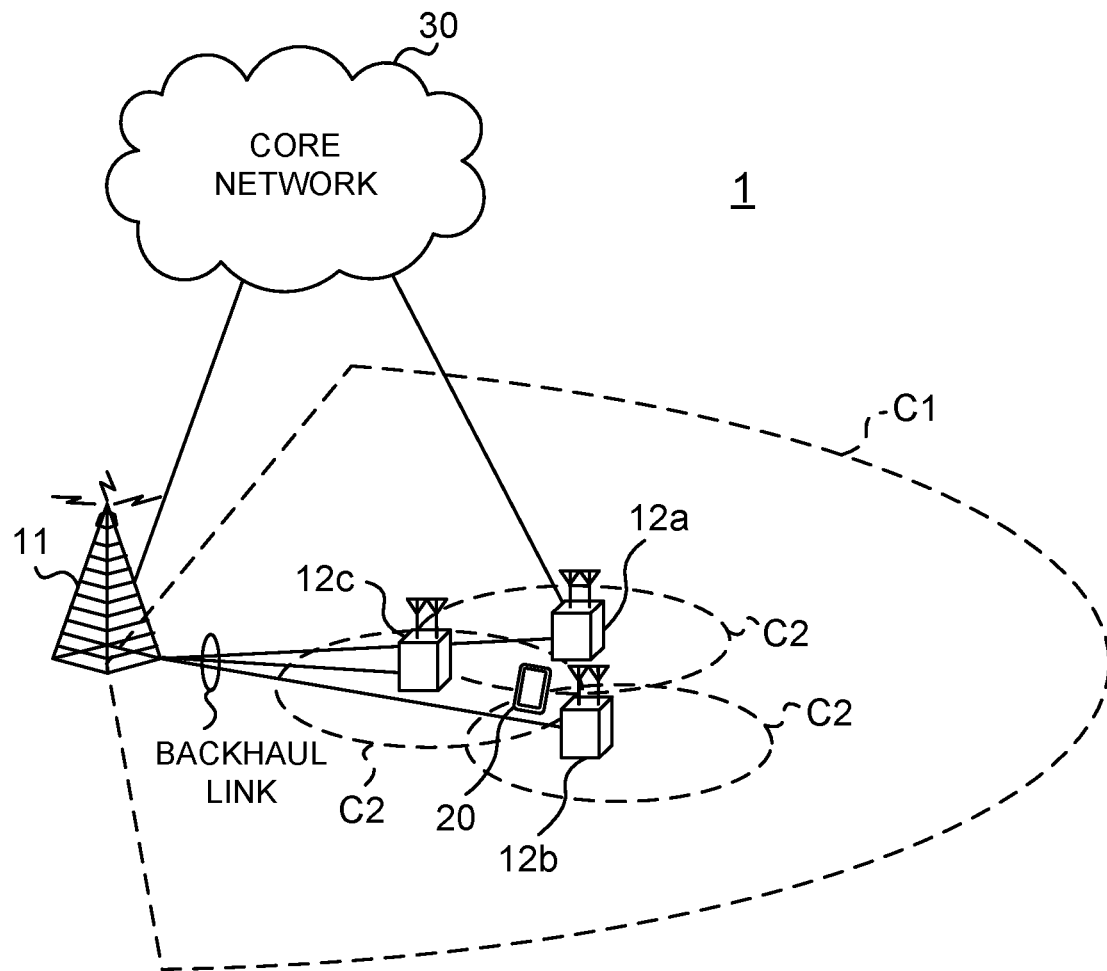
FIG. 12 is a diagram illustrating an example of a schematic configuration of a radio communication system according to an embodiment.

FIG. 12 is a diagram illustrating an example of a schematic configuration of a radio communication system according to an embodiment. A radio communication system 1 may be a system that implements communication using long term evolution (LTE), 5th generation mobile communication system New Radio (5G NR), and the like drafted as the specification by the third generation partnership project (3GPP).

Furthermore, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is a MN, and an LTE (E-UTRA) base station (eNB) is an SN.

The radio communication system 1 may support dual connectivity between a plurality of base stations in the same RAT (for example, dual connectivity in which both a MN and an SN are NR base stations (gNBs)) (NR-NR dual connectivity (NN-DC)).

The radio communication system 1 may include a base station 11 that forms a macro cell C1 with a relatively wide coverage and base stations 12 (12a to 12c) that are arranged within the macro cell C1 and form small cells C2 narrower than the macro cell C1. A user terminal 20 may be located in at least one cell. The arrangement, the number, and the like of the respective cells and the user terminal 20 are not limited to the aspect illustrated in the drawing. Hereinafter, the base stations 11 and 12 will be collectively referred to as base stations 10 unless specified otherwise.

The user terminal 20 may be connected to at least one of the plurality of base stations 10. The user terminal 20 may use at least one of carrier aggregation (CA) using a plurality of component carriers (CCs) and dual connectivity (DC).

Each CC may be included in at least one of a first frequency range 1 (FR1) and a second frequency range 2 (FR2). The macro cell C1 may be included in FR1, and a small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of FR1 and FR2 are not limited thereto, and, for example, FR1 may correspond to a frequency range higher than FR2.

Furthermore, the user terminal 20 may perform communication in each CC using at least one of time division duplex (TDD) and frequency division duplex (FDD).

The plurality of base stations 10 may be connected by wire (for example, an optical fiber or an X2 interface in compliance with common public radio interface (CPRI)) or wirelessly (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

A base station 10 may be connected to a core network 30 via another base station 10 or directly. The core network 30 may include, for example, at least one of evolved packet core (EPC), 5G core network (SGCN), next generation core (NGC), and the like.

The user terminal 20 may be a terminal supporting to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as downlink channels, a downlink shared channel (physical downlink shared channel (PDSCH)) that is shared by respective user terminals 20, a broadcast channel (physical broadcast channel (PBCH)), a downlink control channel (physical downlink control channel (PDCCH)), or the like may be used.

Furthermore, in the radio communication system 1, as uplink channels, an uplink shared channel (physical uplink shared channel (PUSCH)) that is shared by respective user terminals 20, an uplink control channel (physical uplink control channel (PUCCH)), a random access channel (physical random access channel (PRACH)), or the like may be used.

User data, higher layer control information, a system information block (SIB), and the like are transmitted by the PDSCH. User data, higher layer control information, and the like may be transmitted by the PUSCH. Furthermore, a master information block (MIB) may be transmitted by the PBCH.

Lower layer control information may be transmitted by the PDCCH. The lower layer control information may include, for example, downlink control information (DCI) including scheduling information of at least one of the PDSCH and the PUSCH.

Note that DCI that schedules the PDSCH may be referred to as DL assignment, DL DCI, or the like, and DCI that schedules the PUSCH may be referred to as UL grant, UL DCI, or the like. Note that the PDSCH may be replaced with DL data, and the PUSCH may be replaced with UL data.

A control resource set (CORESET) and a Search Space may be used to detect the PDCCH. The CORESET corresponds to a resource that searches for DCI. The Search Space corresponds to a search area and a search method for PDCCH candidates. One CORESET may be associated with one or a plurality of Search Spaces. The UE may monitor the CORESET associated with a given Search Space on the basis of Search Space configuration.

One Search Space may correspond to a PDCCH candidate corresponding to one or a plurality of aggregation levels. One or a plurality of Search Spaces may be referred to as a Search Space set. Note that "Search Space" and "Search Space set", "Search Space configuration" and "Search Space set configuration", and "CORESET" and "CORESET configuration", and the like in the present disclosure may be replaced with each other.

Uplink control information (UCI) including at least one of channel state information (CSI), delivery acknowledgement information (may be referred to as, for example, hybrid automatic repeat request acknowledgement (HARQ-ACK), ACK/NACK, or the like), and scheduling request (SR) may be transmitted by the PUCCH. By means of the PRACH, a random access preamble for establishing a connection with a cell may be transmitted.

Note that in the present disclosure, downlink, uplink, and the like may be expressed without "link". Furthermore, various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), and the like may be transmitted as DL-RSs.

The synchronization signal may be, for example, at least one of a primary synchronization signal (PSS) and a secondary synchronization signal (SSS). A signal block including SS (PSS or SSS) and PBCH (and DMRS for PBCH) may be referred to as an SS/PBCH block, an SS Block (SSB), and the like. Note that the SS, the SSB, or the like may also be referred to as a reference signal.

Furthermore, in the radio communication system 1, a sounding reference signal (SRS), a demodulation reference signal (DMRS), and the like may be transmitted as an uplink reference signal (UL-RS). Note that, a DMRS may be referred to as a "user terminal-specific reference signal (UE-specific reference signal)".

(Base Station)

Figure 13:
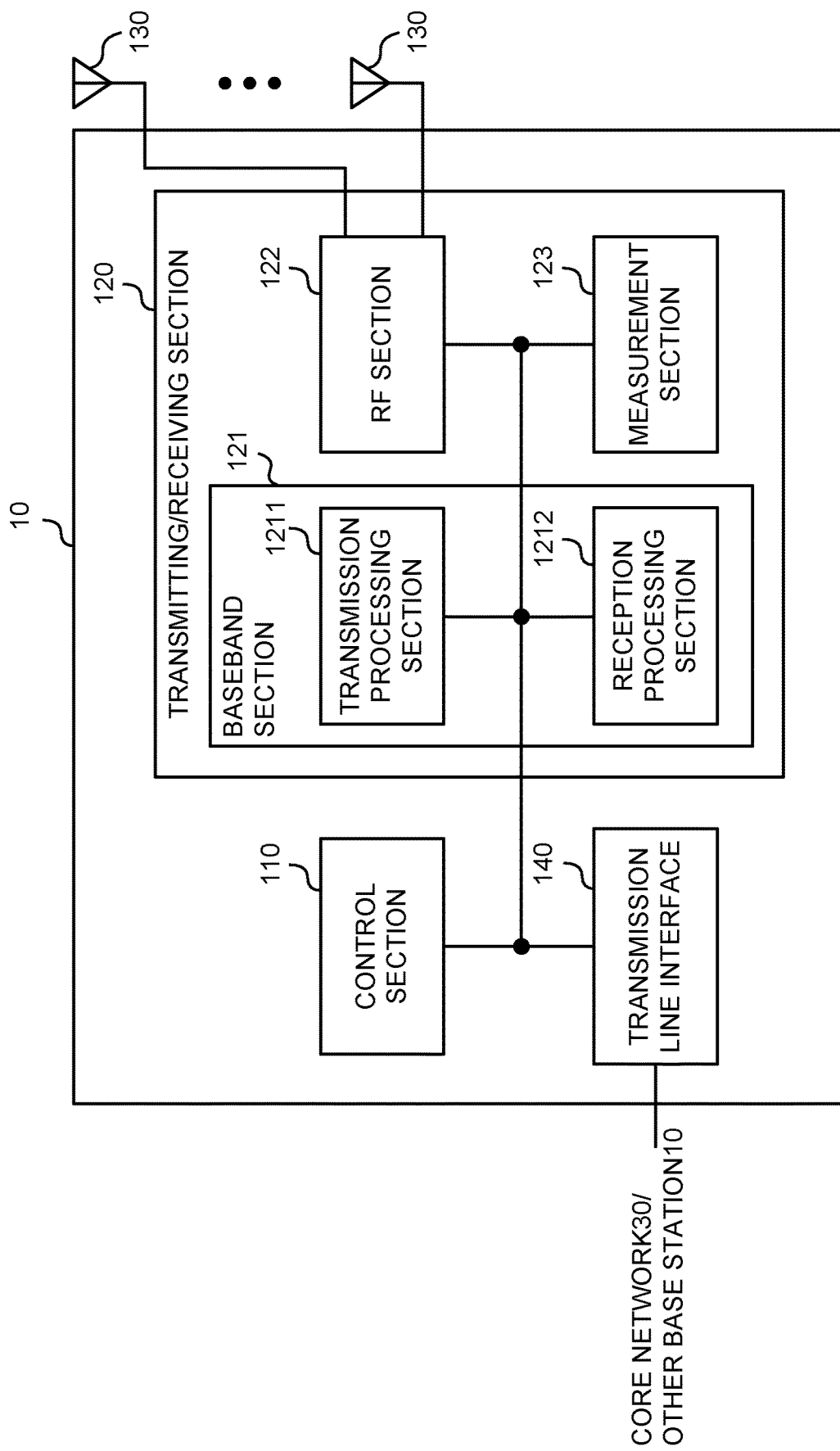
FIG. 13 is a diagram illustrating an example of a configuration of a base station according to an embodiment.

FIG. 13 is a diagram illustrating an example of a configuration of a base station according to an embodiment. A base station 10 includes a control section 110, a transmission/reception section 120, transmission/reception antennas 130, and a transmission line interface 140. Note that one or more control sections 110, one or more transmission/reception sections 120, one or more transmission/reception antennas 130, and one or more transmission line interfaces 140 may be included.

Note that, although this example primarily indicates functional blocks of characteristic parts of the present embodiment, it may be assumed that the base station 10 has other functional blocks that are necessary for radio communication as well. A part of processing of each section described below may be omitted.

The control section 110 controls the entire base station 10. The control section 110 can be constituted by a controller, a control circuit, or the like, which are described on the basis of common understanding in the technical field to which the present disclosure relates.

The control section 110 may control signal generation, scheduling (for example, resource allocation or mapping), and the like. The control section 110 may control transmission/reception, measurement, and the like using the transmission/reception section 120, the transmission/reception antenna 130, and the transmission line interface 140. The control section 110 may generate data to be transmitted as a signal, control information, a sequence, and the like and may transfer the data, the control information, the sequence, and the like to the transmission/reception section 120. The control section 110 may perform call processing (such as configuration or release) of a communication channel, management of the state of the base station 10, management of a radio resource, and the like.

The transmission/reception section 120 may include a baseband section 121, a radio frequency (RF) section 122, and a measurement section 123. The baseband section 121 may include a transmission processing section 1211 and a reception processing section 1212. The transmission/reception section 120 can be constituted by a transmitter/receiver, an RF circuit, a baseband circuit, a filter, a phase shifter, a measurement circuit, a transmission/reception circuit, and the like, which are described on the basis of common understanding in the technical field to which the present disclosure relates.

The transmission/reception section 120 may be configured as an integrated transmission/reception section or may be constituted by a transmission section and a reception section. The transmission section may be constituted by the transmission processing section 1211 and the RF section 122. The reception section may be constituted by the reception processing section 1212, the RF section 122, and the measurement section 123.

The transmission/reception antennas 130 can be constituted by antennas described on the basis of common understanding in the technical field to which the present disclosure relates, for example, an array antenna.

The transmission/reception section 120 may transmit the above-described downlink channel, synchronization signal, downlink reference signal, and the like. The transmission/reception section 120 may receive the above-described uplink channel, uplink reference signal, and the like.

The transmission/reception section 120 may form at least one of a Tx beam and a reception beam by using digital beam forming (for example, precoding), analog beam forming (for example, phase rotation), and the like.

The transmission/reception section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data or control information acquired from the control section 110 to generate a bit string to be transmitted.

The transmission/reception section 120 (transmission processing section 1211) may perform transmission processing such as channel encoding (which may include error correction encoding), modulation, mapping, filtering processing, discrete Fourier transform (DFT) processing (as necessary), inverse fast Fourier transform (IFFT) processing, precoding, or digital-analog conversion on the bit string to be transmitted and may output a baseband signal.

The transmission/reception section 120 (RF section 122) may perform modulation to a radio frequency band, filtering processing, amplification, and the like on the baseband signal and may transmit a signal in a radio frequency band via a transmission/reception antenna 130.

Meanwhile, the transmission/reception section 120 (RF section 122) may perform amplification, filtering processing, demodulation to a baseband signal, and the like on a signal in a radio frequency band received by a transmission/reception antenna 130.

The transmission/reception section 120 (reception processing section 1212) may apply, on the acquired baseband signal, reception processing such as analog-digital conversion, fast Fourier transform (FFT) processing, inverse discrete Fourier transform (IDFT) processing (as necessary), filtering processing, demapping, demodulation, decoding (which may include error correction decoding), MAC layer processing, RLC layer processing, or PDCP layer processing to acquire user data and the like.

The transmission/reception section 120 (measurement section 123) may perform measurement on the received signal. For example, the measurement section 123 may perform radio resource management (RRM) measurement, channel state information (CSI) measurement, and the like on the basis of the received signal. The measurement section 123 may measure received power (e.g., reference signal received power (RSRP)), reception quality (e.g., reference signal received quality (RSRQ), a signal to interference plus noise ratio (SINR), a signal to noise ratio (SNR)), signal strength (e.g., received signal strength indicator (RSSI)), propagation path information (e.g., CSI), and the like. The measurement result may be output to the control section 110.

The transmission line interface 140 may transmit/receive a signal (backhaul signaling) to and from an apparatus included in the core network 30, other base stations 10, and the like and may, for example, acquire or transmit user data (user plane data), control plane data, and the like for the user terminal 20.

Note that the transmission section and the reception section of the base station 10 in the present disclosure may be constituted by at least one of the transmission/reception section 120, the transmission/reception antenna 130, and the transmission line interface 140.

The transmission/reception section 120 may transmit downlink control information for triggering feedback of a HARQ-ACK of one shot.

In a case where feedback of the HARQ-ACK is performed on the basis of the downlink information, the control section 110 may control reception of a codebook including HARQ-ACKs each corresponding to one of a plurality of service types or HARQ-ACKs having different priorities. Alternatively, in a case where feedback of the HARQ-ACK is performed on the basis of the downlink information, the control section 110 may control reception of codebooks separately including HARQ-ACKs each corresponding to one of a plurality of service types or HARQ-ACKs having different priorities.

(User Terminal)

Figure 14:
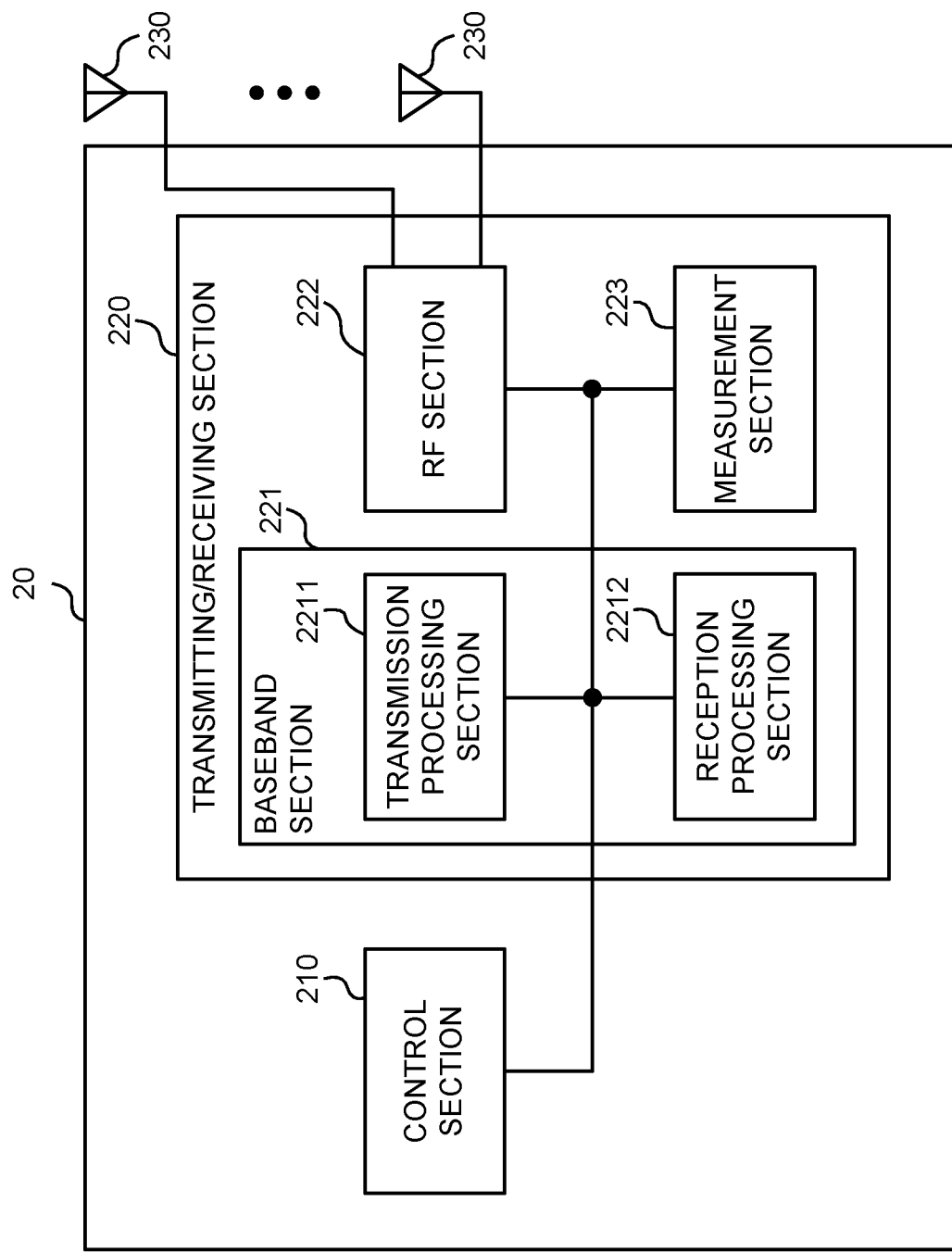
FIG. 14 is a diagram illustrating an example of a configuration of a user terminal according to an embodiment.

FIG. 14 is a diagram illustrating an example of a configuration of a user terminal according to an embodiment. The user terminal 20 includes a control section 210, a transmission/reception section 220, and transmission/reception antennas 230. Note that one or more control sections 210, one or more transmission/reception sections 220, and one or more transmission/reception antennas 230 may be provided.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can be constituted by a controller, a control circuit, or the like which are described on the basis of common understanding in the technical field to which the present disclosure relates.

The control section 210 may control signal generation, mapping, and the like. The control section 210 may control transmission/reception, measurement, and the like using the transmission/reception section 220 and the transmission/reception antenna 230. The control section 210 may generate data to be transmitted as a signal, control information, a sequence, and the like and may transfer the data, the control information, the sequence, and the like to the transmission/reception section 220.

The transmission/reception section 220 may include a baseband section 221, an RF section 222, and a measurement section 223. The baseband section 221 may include a transmission processing section 2211 and a reception processing section 2212. The transmission/reception section 220 can be constituted by a transmitter/receiver, an RF circuit, a baseband circuit, a filter, a phase shifter, a measurement circuit, a transmission/reception circuit, and the like which are described on the basis of common understanding in the technical field to which the present disclosure relates.

The transmission/reception section 220 may be constituted as an integrated transmission/reception section or may be constituted by a transmission section and a reception section. The transmission section may be constituted by the transmission processing section 2211 and the RF section 222. The reception section may be constituted by the reception processing section 2212, the RF section 222, and the measurement section 223.

The transmission/reception antennas 230 can be constituted by antennas described based on common understanding in the technical field to which the present disclosure relates, for example, an array antenna.

The transmission/reception section 220 may receive the above-described downlink channel, synchronization signal, downlink reference signal, and the like. The transmission/reception section 220 may transmit the above-described uplink channel, uplink reference signal, and the like.

The transmission/reception section 220 may form at least one of a Tx beam and a reception beam by using digital beam forming (for example, precoding), analog beam forming (for example, phase rotation), and the like.

The transmission/reception section 220 (transmission processing section 2211) may perform PDCP layer processing, RLC layer processing (for example, RLC retransmission control), MAC layer processing (for example, HARQ retransmission control), and the like, for example, on data acquired from the control section 210 or control information to generate a bit string to be transmitted.

The transmission/reception section 220 (transmission processing section 2211) may perform transmission processing such as channel encoding (which may include error correction encoding), modulation, mapping, filtering processing, DFT processing (as necessary), IFFT processing, precoding, or digital-analog conversion on a bit string to be transmitted and may output a baseband signal.

Note that whether or not to apply DFT processing may be determined on the basis of the configuration of transform precoding. When transform precoding is enabled for a channel (for example, PUSCH), the transmission/reception section 220 (transmission processing section 2211) may perform DFT processing as the transmission processing in order to transmit the channel using a DFT-s-OFDM waveform. When transform precoding is not enabled for a channel (for example, PUSCH), the transmission/reception section 220 may not perform DFT processing as the transmission processing.

The transmission/reception section 220 (RF section 222) may perform modulation to a radio frequency band, filtering processing, amplification, and the like on the baseband signal and may transmit the signal in the radio frequency band via the transmission/reception antenna 230.

Meanwhile, the transmission/reception section 220 (RF section 222) may perform amplification, filtering processing, demodulation to a baseband signal, and the like on the signal in the radio frequency band received by a transmission/reception antenna 230.

The transmission/reception section 220 (reception processing section 2212) may acquire user data and the like by applying reception processing such as analog-digital conversion, FFT processing, IDFT processing (as necessary), filtering processing, demapping, demodulation, decoding (which may include error correction decoding), MAC layer processing, RLC layer processing, or PDCP layer processing on the acquired baseband signal.

The transmission/reception section 220 (measurement section 223) may perform measurement on the received signal. For example, the measurement section 223 may perform RRM measurement, CSI measurement, and the like on the basis of the received signal. The measurement section 223 may measure received power (e.g., RSRP), reception quality (e.g., RSRQ, SINR, or SNR), signal strength (e.g., RSSI), propagation path information (e.g., CSI), and the like. The measurement result may be output to the control section 210.

Note that the transmission section and the reception section of the user terminal 20 in the present disclosure may be constituted by at least one of the transmission/reception section 220 and the transmission/reception antenna 230.

The transmission/reception section 220 receives downlink control information for triggering feedback of a HARQ-ACK of one shot.

In a case where the feedback of the HARQ-ACK is performed on the basis of the downlink information, the control section 210 may control feedback of HARQ-ACKs each corresponding to one of a plurality of service types or HARQ-ACKs having different priorities by using a shared codebook. The HARQ-ACKs each corresponding to one of the plurality of service types or the HARQ-ACKs having different priorities may be simultaneously triggered by the downlink control information.

The control section 210 may determine an uplink shared channel used for the feedback of the HARQ-ACK on the basis of configuration information of an uplink control channel set for a specific service type or a specific priority. Alternatively, the control section 210 may determine the uplink shared channel used for the feedback of the HARQ-ACK on the basis of the downlink control information.

Alternatively, in a case where the feedback of the HARQ-ACK is performed on the basis of the downlink information, the control section 210 may control feedback of HARQ-ACKs each corresponding to one of a plurality of service types or HARQ-ACKs having different priorities by using different codebooks. The HARQ-ACKs each corresponding to one of the plurality of service types or the HARQ-ACKs having different priorities may be separately triggered by the downlink control information.

For HARQ-ACKs of a plurality of service types or HARQ-ACKs having different priorities, at least one of a shared HARQ-ACK process number or a shared component carrier may be applied. For HARQ-ACKs of a plurality of service types or HARQ-ACKs having different priorities, at least one of different HARQ-ACK process numbers or different component carriers may be applied.

(Hardware Configuration)

Note that the block diagrams that have been used to describe the above embodiments illustrate blocks in functional units. These functional blocks (configuration units) may be implemented in desired combinations of at least one of hardware or software. Furthermore, the method for implementing each functional block is not particularly limited. That is, each functional block may be implemented by a single apparatus physically or logically aggregated or may be implemented by directly or indirectly connecting (for example, in a wired or wireless manner) two or more physically or logically separate apparatuses and using these apparatuses. The functional blocks may be implemented by combining software with the above-described single apparatus or the above-described plurality of apparatuses.

Here, the function includes, but not limited to, deciding, determining, judging, calculating, computing, processing, deriving, investigating, searching, ascertaining, receiving, transmitting, outputting, accessing, solving, selecting, choosing, establishing, comparing, assuming, expecting, considering, broadcasting, notifying, communicating, forwarding, configuring, reconfiguring, allocating, mapping, and assigning. For example, a functional block (configuration unit) that causes transmission to function may be referred to as a transmitting unit, a transmitter, and the like. In any case, as described above, the implementation method is not particularly limited.

Figure 15:
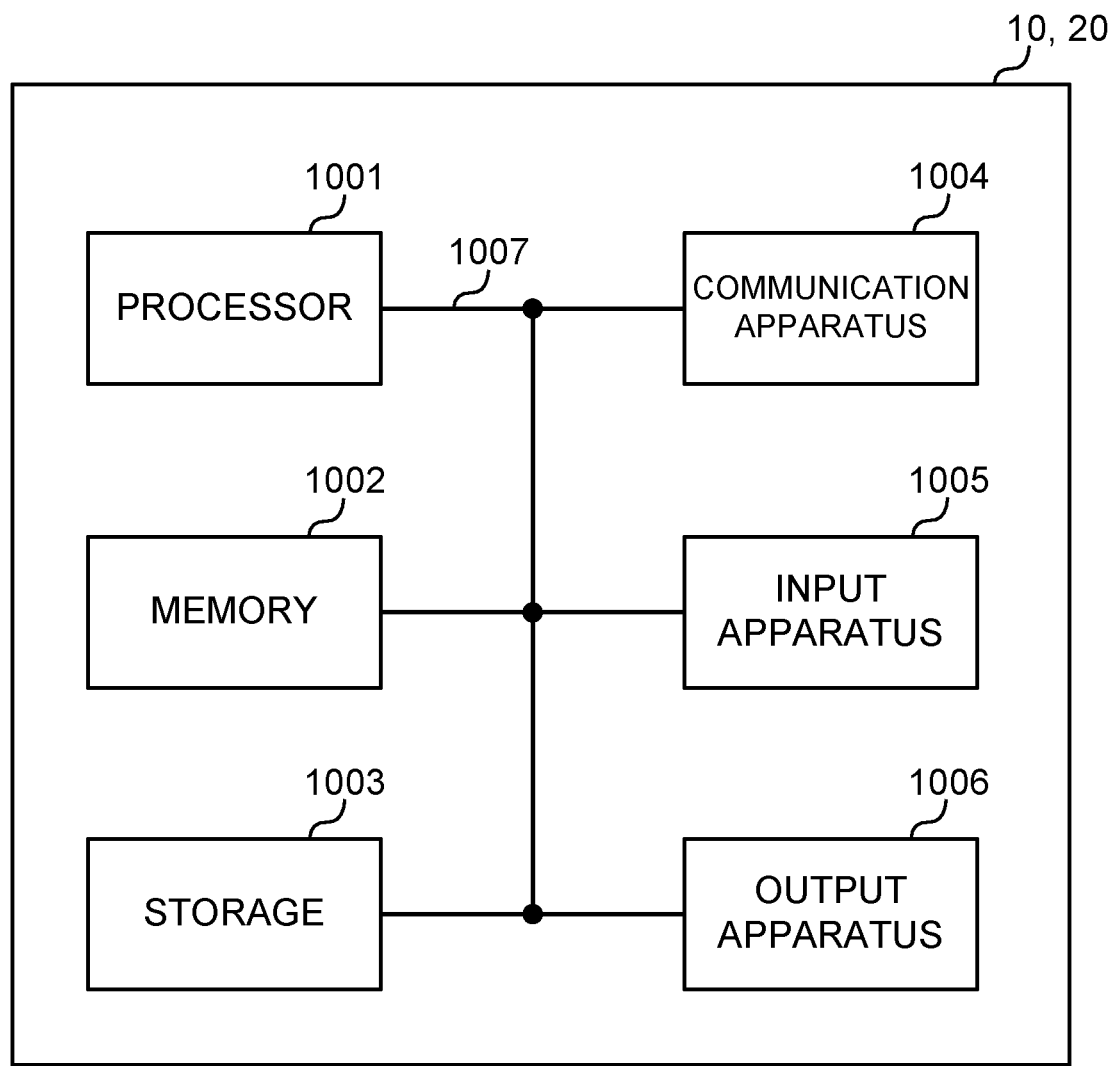
FIG. 15 is a diagram illustrating an example of a hardware configuration of a base station and a user terminal according to an embodiment.

For example, the base station, the user terminal, and the like according to one embodiment of the present disclosure may function as a computer that executes the processing of the radio communication method of the present disclosure. FIG. 15 is a diagram illustrating an example of a hardware configuration of a base station and a user terminal according to an embodiment. Physically, the above-described base station 10 and user terminal 20 may be configured as a computer apparatus that includes a processor 1001, a memory 1002, a storage 1003, a communication apparatus 1004, an input apparatus 1005, an output apparatus 1006, a bus 1007, and the like.

Note that in the present disclosure, terms such as an apparatus, a circuit, a device, a section, or a unit can be replaced with each other. The hardware configuration of the base station 10 and the user terminal 20 may be configured to include one or a plurality of apparatuses illustrated in the drawings or may be configured without including some apparatuses.

For example, although only one processor 1001 is illustrated, a plurality of processors may be provided. Furthermore, processing may be executed by one processor or may be executed by two or more processors simultaneously, in sequence, or by another method. Note that the processor 1001 may be implemented by one or more chips.

Each of functions of the base station 10 and the user terminal 20 is implemented by causing given software (program) to be read on hardware such as the processor 1001 or the memory 1002, thereby causing the processor 1001 to perform operation, to control communication via the communication apparatus 1004, and to control at least one of reading and writing of data in the memory 1002 and the storage 1003.

The processor 1001 controls the whole computer by, for example, running an operating system. The processor 1001 may be configured by a central processing unit (CPU) including an interface with peripheral equipment, a control apparatus, an operation apparatus, a register, and the like. For example, at least a part of the above-described control section 110 (210), transmission/reception section 120 (220), and the like may be implemented by the processor 1001.

Furthermore, the processor 1001 reads programs (program codes), software modules, data, and the like from at least one of the storage 1003 or the communication apparatus 1004 into the memory 1002 and executes various types of processing according to these. As the program, a program for causing a computer to execute at least a part of the operation described in the above embodiments is used. For example, the control section 110 (210) may be implemented by a control program that is stored in the memory 1002 and operates in the processor 1001 or may be implemented similarly by other functional blocks.

The memory 1002 is a computer-readable recording medium, and may be constituted by, for example, at least one of a read only memory (ROM), an erasable programmable ROM (EPROM), an electrically EPROM (EEPROM), a random access memory (RAM) or other desired storage media. The memory 1002 may be referred to as a "register", a "cache", a "main memory (primary storage device)", and the like. The memory 1002 can store a program (program code), a software module, and the like, which are executable for implementing the radio communication method according to one embodiment of the present disclosure.

The storage 1003 is a computer-readable recording medium, and may be constituted by, for example, at least one of a flexible disk, a floppy (registered trademark) disk, a magneto-optical disk (for example, a compact disc ROM (CD-ROM) and the like), a digital versatile disc, a Blu-ray (registered trademark) disc), a removable disk, a hard disk drive, a smart card, a flash memory device (for example, a card, a stick, a key drive), a magnetic stripe, a database, a server, and other desirable storage media. The storage 1003 may be referred to as a "secondary storage device".

The communication apparatus 1004 is hardware (transmitting/receiving device) for allowing inter-computer communication by using at least one of a wired network and a wireless network and may be referred to as, for example, a network device, a network controller, a network card, a communication module, and the like. The communication apparatus 1004 may be constituted by a high frequency switch, a duplexer, a filter, a frequency synthesizer, and the like in order to implement, for example, at least one of frequency division duplex (FDD) or time division duplex (TDD). For example, the transmission/reception section 120 (220) and the transmission/reception antennas 130 (230) described above may be implemented by the communication apparatus 1004. The transmission/reception section 120 (220) may be implemented by physically or logically separating a transmission section 120a (220a) and a reception section 120b (220b) from each other.

The input apparatus 1005 is an input device for receiving input from the outside (for example, a keyboard, a mouse, a microphone, a switch, a button, a sensor, and the like). The output apparatus 1006 is an output device that performs output to the outside (for example, a display, a speaker, a light emitting diode (LED) lamp, and the like). Note that the input apparatus 1005 and the output apparatus 1006 may be integrated (for example, a touch panel).

Furthermore, the respective devices such as the processor 1001 and the memory 1002 are connected by the bus 1007 for communicating information. The bus 1007 may be constituted by a single bus or may include different buses between devices.

Furthermore, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented by at least one of these pieces of hardware.

Modification

Note that terms described in the present disclosure and terms necessary for understanding the present disclosure may be replaced with terms that have the same or similar meanings. For example, a channel, a symbol, and a signal (signal or signaling) may be replaced interchangeably. Furthermore, the signal may be a message. A reference signal can be abbreviated as "RS" and may be referred to as a "pilot", a "pilot signal", and the like, depending on which standard applies. Furthermore, a component carrier (CC) may be referred to as a cell, a frequency carrier, a carrier frequency, and the like.

A radio frame may include one or a plurality of periods (frames) in the time domain. Each of the one or plurality of periods (frames) constituting the radio frame may be referred to as a "subframe". Furthermore, a subframe may include one or a plurality of slots in the time domain. A subframe may have a fixed time duration (for example, 1 ms) that is not dependent on numerology.

Here, numerology may be a communication parameter applied to at least one of transmission and reception of a given signal or channel. Numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, and specific windowing processing performed by the transceiver in the time domain.

A slot may be constituted by one or a plurality of symbols in the time domain (orthogonal frequency division multiplexing (OFDM) symbols, single carrier frequency division multiple access (SC-FDMA) symbols, and the like). Also, a slot may be a time unit based on numerology.

A slot may include a plurality of mini slots. Each mini slot may include one or a plurality of symbols in the time domain. Furthermore, a mini slot may be referred to as a "subslot". Each mini slot may include fewer symbols than a slot does. A PDSCH (or PUSCH) transmitted in a time unit larger than a mini slot may be referred to as PDSCH (PUSCH) mapping type A. A PDSCH (or PUSCH) transmitted using a mini slot may be referred to as PDSCH (PUSCH) mapping type B.

A radio frame, a subframe, a slot, a mini slot, and a symbol all represent a time unit for transmission of a signal. A radio frame, a subframe, a slot, a mini slot, and a symbol may be referred to by other corresponding names. Note that time units such as a frame, a subframe, a slot, a mini slot, and a symbol in the present disclosure may be replaced with each other.

For example, one subframe may be referred to as a TTI, a plurality of contiguous subframes may be referred to as a TTI, or one slot or one mini slot may be referred to as a TTI. That is, at least one of a subframe and a TTI may be a subframe (1 ms) in the existing LTE, may be a period shorter than 1 ms (e.g., one to thirteen symbols), or may be a period longer than 1 ms. Note that the unit representing the TTI may be referred to as a "slot", a "mini slot", or the like instead of a "subframe".

Here, a TTI refers to the minimum time unit of scheduling in radio communication, for example. For example, in the LTE system, a base station performs scheduling to assign radio resources (such as a frequency bandwidth and transmission power that can be used in each user terminal) to each user terminal for every TTI. Note that the definition of a TTI is not limited thereto.

The TTI may be a transmission time unit of channel-encoded data packets (transport blocks), code blocks, codewords, or the like or may be a processing unit of scheduling, link adaptation, or the like. Note that, when a TTI is given, a time interval (for example, the number of symbols) to which transport blocks, code blocks, codewords, or the like are actually mapped may be shorter than the TTI.

Note that, in a case where one slot or one mini slot is referred to as a "TTI", one or more TTIs (that is, one or more slots or one or more mini slots) may be the minimum time unit of scheduling. Also, the number of slots (the number of mini slots) constituting this minimum time unit of scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, and the like. A TTI that is shorter than the usual TTI may be referred to as a shortened TTI, a short TTI, a partial TTI (or fractional TTI), a shortened subframe, a short subframe, a mini slot, a subslot, a slot, and the like.

Note that a long TTI (such as a usual TTI and a subframe) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain and may include one or a plurality of contiguous subcarriers in the frequency domain. The number of subcarriers included in a RB may be the same regardless of the numerology and may be, for example, twelve. The number of subcarriers included in a RB may be determined on the basis of the numerology.

Also, an RB may include one or a plurality of symbols in the time domain, and may have a length of one slot, one mini slot, one subframe, or one TTI. One TTI, one subframe, and the like may be each constituted by one or a plurality of resource blocks.

Note that one or a plurality of RBs may be referred to as a physical RB (PRB), a sub-carrier group (SCG), a resource element group (REG), a PRB pair, an RB pair, or the like.

Furthermore, a resource block may be constituted by one or a plurality of resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a given numerology in a given carrier. Here, the common RB may be specified by an index of an RB based on a common reference point of the carrier. A PRB may be defined in a given BWP and be numbered within the BWP.

The BWP may include UL BWP (BWP for UL) and DL BWP (BWP for DL). For a UE, one or a plurality of BWPs may be configured within one carrier.

At least one of the configured BWPs may be active, and it is not necessary for the UE to assume that a given signal/channel be transmitted and received outside the active BWP. Note that a "cell", a "carrier", or the like in the present disclosure may be replaced with a "BWP".

Note that the structures of radio frames, subframes, slots, mini slots, symbols, or the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be modified in various manners.

Furthermore, the information, parameters, and the like described in the present disclosure may be represented using absolute values or relative values with respect to given values or may be represented using other corresponding information. For example, a radio resource may be specified by a given index.

The names used for parameters and the like in the present disclosure are in no respect limiting. Furthermore, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not limiting in any respect.

The information, signals, and the like described in the present disclosure may be represented by using any of a variety of different technologies. For example, data, instructions, commands, information, signals, bits, symbols, and chips, all of which may be referenced throughout the above description, may be represented by voltages, currents, electromagnetic waves, magnetic fields or particles, optical fields or photons, or any combination thereof.

Furthermore, information, signals, and the like can be output in at least one of a direction from higher layers to lower layers or a direction from lower layers to higher layers. Information, signals, or the like may be input and output via a plurality of network nodes.

Information, signals, or the like that are input and/or output may be stored in a specific location (for example, in a memory), or may be managed in a control table. Information, signals, and the like that are input and/or output can be overwritten, updated, or appended. Information, signals, and the like that are output may be deleted. Information, signals, and the like that are input may be transmitted to other devices.

Notification of information may be performed not only by using the aspects/embodiments described in the present disclosure but also using another method. For example, notification of information in the present disclosure may be performed by using physical layer signaling (for example, downlink control information (DCI), uplink control information (UCI)), higher layer signaling (for example, radio resource control (RRC) signaling, broadcast information (master information block (MIB), system information block (SIB), or the like), medium access control (MAC) signaling), another signal, or a combination thereof.

Note that physical layer signaling may be referred to as Layer 1/Layer 2 (L1/L2) control information (L1/L2 control signals), L1 control information (L1 control signal), or the like. Furthermore, the RRC signaling may be referred to as an RRC message, and may be, for example, an RRC connection setup message, an RRC connection reconfiguration message, and the like. Furthermore, MAC signaling may be notified using, for example, MAC control elements (MAC control elements (CEs)).

Furthermore, a notification of given information (for example, notification of "being X") is not limited to explicit notification but may be performed implicitly (for example, by not performing notification of the given information or by performing notification of another piece of information).

Judgement may be made in values represented by one bit (0 or 1), may be made in Boolean values that represent true or false, or may be made by comparing numerical values (for example, comparison with a given value).

Software, regardless of whether it is referred to as "software", "firmware", "middleware", "microcode" or "hardware description language", or by other names, should be interpreted broadly, to mean instructions, instruction sets, codes, code segments, program codes, programs, subprograms, software modules, applications, software applications, software packages, routines, subroutines, objects, executable files, execution threads, procedures, functions, or the like.

Moreover, software, commands, information, or the like may be transmitted and received via transmission media. For example, in a case where software is transmitted from a website, a server, or another remote source by using at least one of wired technology (coaxial cable, optical fiber cable, twisted pair, digital subscriber line (DSL), or the like) or wireless technology (infrared rays, microwaves, and the like), at least one of the wired technology and the wireless technology is included within the definition of the transmission media.

The terms "system" and "network" used in the present disclosure can be used interchangeably. A "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. A base station may be referred to by a term such as a macro cell, a small cell, a femto cell, or a pico cell.

A base station can accommodate one or a plurality of (for example, three) cells. In a case where a base station accommodates a plurality of cells, the entire coverage area of the base station can be partitioned into a plurality of smaller areas, and each of the smaller areas can provide communication service through a base station subsystem (e.g., indoor small base station (remote radio head (RRH))). The term "cell" or "sector" refers to a part or the whole of the coverage area of at least one of a base station and a base station subsystem that performs a communication service in this coverage.

In the present disclosure, terms such as "mobile station (MS)", "user terminal", "user equipment (UE)", and "terminal" can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmitting apparatus, a receiving apparatus, a radio communication apparatus, and the like. Note that at least one of the base station and the mobile station may be a device mounted on a moving object, a moving object itself, and the like. The moving object may be a transportation (for example, a car, an airplane, and the like), an unmanned moving object (for example, a drone, an autonomous car, and the like), or a robot (manned or unmanned). Note that at least one of the base station and the mobile station also includes a device that is not necessarily transported during a communication operation. For example, at least one of the base station and the mobile station may be an Internet of Things (IoT) device such as a sensor.

Furthermore, a base station in the present disclosure may be replaced with a user terminal. For example, each aspect/embodiment of the present disclosure may be applied to a configuration in which communication between a base station and a user terminal is replaced with communication between a plurality of user terminals (which may be referred to as, for example, device-to-device (D2D), vehicle-to-everything (V2X), and the like). In the case, the user terminal 20 may have the function of the above-described base station 10. In addition, terms such as "uplink" and "downlink" may be replaced with terms corresponding to communication between terminals (for example, "side"). For example, the uplink channel, the downlink channel, and the like may be replaced with a side channel.

Similarly, a user terminal in the present disclosure may be replaced with a base station. In this case, the base station 10 may have the function of the above-described user terminal 20

In the present disclosure, the operation performed by a base station may be performed by an upper node thereof in some cases. In a network including one or a plurality of network nodes with base stations, it is clear that various operations performed for communication with a terminal can be performed by a base station, one or more network nodes (examples of which include but are not limited to mobility management entity (MME) and serving-gateway (S-GW)) other than the base station), or a combination thereof.

Each aspect/embodiment described in the present disclosure may be used alone, used in combination, or used while switched in association with execution. Furthermore, the order of processing procedures, sequences, flowcharts, and the like of the aspects/embodiments described in the present disclosure may be re-ordered as long as there is no inconsistency. For example, regarding the methods described in the present disclosure, elements of various steps are presented using an illustrative order and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new-radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-Wide Band (UWB), Bluetooth (registered trademark), or another appropriate radio communication method, a next generation system expanded based on these, and the like. Furthermore, a plurality of systems may be combined (for example, a combination of LTE or LTE-A and 5G) and applied.

The phrase "on the basis of" as used in the present disclosure does not mean "on the basis of only" unless otherwise specified. In other words, the phrase "on the basis of" means both "on the basis of only" and "on the basis of at least".

Any reference to an element using designations such as "first" and "second" used in the present disclosure does not generally limit the amount or order of these elements. These designations may be used in the present disclosure only for convenience, as a method for distinguishing between two or more elements. Thus, the reference to the first and second elements does not mean that only two elements may be adopted or that the first element must precede the second element in a given manner.

The term "deciding (determining)" used in the present disclosure may include a wide variety of operations. For example, "deciding (determining)" may be regarded as "deciding (determining)" on judging, calculating, computing, processing, deriving, investigating, looking up, search, inquiry (for example, looking up in a table, a database, or another data structure), ascertaining, and the like.

Furthermore, "deciding (determining)" may be regarded as "deciding (determining)" on receiving (for example, receiving information), transmitting (for example, transmitting information), input, output, accessing (for example, accessing to data in a memory), and the like.

Furthermore, "deciding (determining)" may be regarded as "deciding (determining)" on resolving, selecting, choosing, establishing, comparing, and the like. In other words, "deciding (determining)" may be regarded as "deciding (determining)" on a given operation.

Furthermore, "determining" may be replaced with "assuming", "expecting", "considering", and the like.

The terms "connected" and "coupled", or any variation thereof used in the present disclosure mean all direct or indirect connections or coupling between two or more elements and can include the presence of one or more intermediate elements between the two elements that are "connected" or "coupled" to each other. The coupling or connection between the elements may be physical, logical or a combination thereof. For example, "connection" may be replaced with "access".

In the present disclosure, when two elements are connected, these elements can be considered to be "connected" or "coupled" to each other by using one or more electrical wires, cables, printed electrical connections, and the like, and by using, as some non-limiting and non-inclusive examples, electromagnetic energy, and the like having a wavelength in the radio frequency domain, the microwave domain, and the optical (both visible and invisible) domain.

In the present disclosure, the phrase "A and B are different" may mean that "A and B are different from each other". Note that the phrase may mean that "A and B are each different from C". The terms such as "leave", "coupled", and the like may be interpreted in a similar manner to that of "being different".

In a case where terms such as "include", "including", and variations of these are used in the present disclosure, these terms are intended to be inclusive like the term "comprising" is. Moreover, the term "or" used in the present disclosure is intended not to be exclusive-OR.

In the present disclosure, for example, in a case where translations add articles, such as a, an, and the in English, the present disclosure may include that a noun that follows these articles is in a plural form.

Although the invention according to the present disclosure has been described in detail above, it is obvious to a person skilled in the art that the invention according to the present disclosure is by no means limited to the embodiments described in the present disclosure. The invention according to the present disclosure can be implemented with modifications and modified aspects without departing from the spirit and scope of the invention defined on the basis of the description of claims. Therefore, the description in the present disclosure is provided for the purpose of describing examples, and thus, should by no means be construed to limit the invention according to the present disclosure in any way.

The invention claimed is:

1. A terminal comprising:
   a receiver that receives downlink control information for triggering feedback of a one-shot HARQ-ACK; and
   a processor that controls feedback of HARQ-ACKs each corresponding to one of a plurality of service types or HARQ-ACKs having different priorities by using different codebooks in a case where the feedback of the HARQ-ACK is performed on the basis of the downlink control information,
   wherein, for HARQ-ACKs of the plurality of service types or HARQ-ACKs having different priorities, at least one of a shared HARQ-ACK process number or a shared component carrier is applied.

2. The terminal according to claim 1, wherein the HARQ-ACKs each corresponding to one of the plurality of service types or the HARQ-ACKs having different priorities are separately triggered by the downlink control information.

3. The terminal according to claim 1, wherein, for HARQ-ACKs of the plurality of service types or HARQ-ACKs having different priorities, at least one of different HARQ-ACK process numbers or different component carriers is applied.

4. The terminal according to claim 2, wherein, for HARQ-ACKs of the plurality of service types or HARQ-ACKs having different priorities, at least one of different HARQ-ACK process numbers or different component carriers is applied.

5. A radio communication method, comprising the steps of:
   receiving downlink control information for triggering feedback of a one-shot HARQ-ACK;
   controlling feedback of HARQ-ACKs each corresponding to one of a plurality of service types or HARQ-ACKs having different priorities by using different codebooks in a case where the feedback of the HARQ-ACK is performed on the basis of the downlink control information, and
   applying at least one of a shared HARQ-ACK process number or a shared component carrier for HARQ-ACKs of the plurality of service types or HARQ-ACKs having different priorities.

6. A base station comprising:
   a transmitter that transmits downlink control information for triggering feedback of a one-shot HARQ-ACK; and
   a processor that controls reception of codebooks separately including HARQ-ACKs each corresponding to one of a plurality of service types or HARQ-ACKs having different priorities in a case where the feedback of the HARQ-ACK is performed on the basis of the downlink control information,
   wherein, for HARQ-ACKs of the plurality of service types or HARQ-ACKs having different priorities, at least one of a shared HARQ-ACK process number or a shared component carrier is applied.

* * * * *